US009355036B2

(12) United States Patent
Beard et al.

(10) Patent No.: US 9,355,036 B2
(45) Date of Patent: May 31, 2016

(54) SYSTEM AND METHOD FOR OPERATING A SYSTEM TO CACHE A NETWORKED FILE SYSTEM UTILIZING TIERED STORAGE AND CUSTOMIZABLE EVICTION POLICIES BASED ON PRIORITY AND TIERS

(71) Applicant: NetApp, Inc., Sunnyvale, CA (US)

(72) Inventors: Derek Beard, Austin, TX (US);
Ghassan Yammine, Leander, TX (US);
Gregory Dahl, Austin, TX (US)

(73) Assignee: NetApp, Inc., Sunnyvale, CA (US)

( * ) Notice: Subject to any disclaimer, the term of this patent is extended or adjusted under 35 U.S.C. 154(b) by 70 days.

(21) Appl. No.: 14/031,026

(22) Filed: Sep. 18, 2013

(65) Prior Publication Data

US 2014/0082288 A1    Mar. 20, 2014

Related U.S. Application Data

(60) Provisional application No. 61/702,694, filed on Sep. 18, 2012, provisional application No. 61/702,695, filed on Sep. 18, 2012, provisional application No. 61/702,692, filed on Sep. 18, 2012, provisional application No. 61/702,690, filed on Sep. 18, 2012, provisional application No. 61/702,687, filed on Sep. 18, 2012.

(51) Int. Cl.
*G06F 12/08*   (2016.01)
*G06F 3/06*    (2006.01)
*G06F 17/30*   (2006.01)

(52) U.S. Cl.
CPC .......... *G06F 12/0875* (2013.01); *G06F 3/0611* (2013.01); *G06F 3/0646* (2013.01); *G06F 3/0671* (2013.01); *G06F 17/30132* (2013.01)

(58) Field of Classification Search
None
See application file for complete search history.

(56) References Cited

U.S. PATENT DOCUMENTS

| | | |
|---|---|---|
| 5,432,912 A | 7/1995 | Kihara |
| 5,592,611 A | 1/1997 | Midgely et al. |
| 5,710,885 A | 1/1998 | Bondi |
| 5,893,140 A | 4/1999 | Vahalia et al. |
| 5,937,406 A | 8/1999 | Balabine |
| 6,324,581 B1 | 11/2001 | Xu et al. |
| 6,401,093 B1 | 6/2002 | Anand et al. |
| 6,658,540 B1 | 12/2003 | Sicola et al. |
| 6,938,039 B1 | 8/2005 | Bober |
| 7,035,907 B1 | 4/2006 | Decasper et al. |
| 7,069,278 B2 | 6/2006 | Telkowski et al. |
| 7,149,858 B1 | 12/2006 | Kiselev |

(Continued)

FOREIGN PATENT DOCUMENTS

WO    WO-2013/022582 A2    2/2013

OTHER PUBLICATIONS

D.Bossen, J. Tendler, K. Reick, "Power4 system design for high reliability," IEEE Micro Magazine, vol. 22 No. 2, pp. 16-24, Mar.-Apr. 2002.*

(Continued)

*Primary Examiner* — Christian P Chace
*Assistant Examiner* — Chie Yew
(74) *Attorney, Agent, or Firm* — Mahamedi Paradice LLP

(57) ABSTRACT

A network attached storage (NAS) caching appliance, system, and associated method of operation for caching a networked file system. Still further, some embodiments provide for a cache system that implements a mufti-tiered, policy-influenced block replacement algorithm.

11 Claims, 10 Drawing Sheets

(56) References Cited

U.S. PATENT DOCUMENTS

| | | |
|---|---|---|
| 7,203,731 B1 | 4/2007 | Coates et al. |
| 7,444,335 B1 | 10/2008 | Colrain et al. |
| 7,571,168 B2 | 8/2009 | Bahar et al. |
| 7,574,443 B2 | 8/2009 | Bahar et al. |
| 7,603,372 B1 | 10/2009 | Honicky et al. |
| 7,653,699 B1 | 1/2010 | Colgrove et al. |
| 7,698,306 B2 | 4/2010 | Watanabe et al. |
| 7,769,723 B2 | 8/2010 | Zheng et al. |
| 7,844,584 B1 | 11/2010 | Griess |
| 7,925,629 B2 | 4/2011 | Webman et al. |
| 7,953,819 B2 | 5/2011 | Liang et al. |
| 8,117,244 B2 | 2/2012 | Marinov et al. |
| 8,281,360 B2 | 10/2012 | Flewallen et al. |
| 8,285,817 B1 | 10/2012 | Balasubramanian et al. |
| 8,346,966 B1 | 1/2013 | Phatak et al. |
| 8,452,856 B1 | 5/2013 | Lent et al. |
| 8,484,164 B1 | 7/2013 | Sivakumar et al. |
| 8,655,848 B1 | 2/2014 | Leverett et al. |
| 8,676,980 B2 | 3/2014 | Kreeger et al. |
| 9,116,914 B1* | 8/2015 | Muthirisavenugopal ......... G06F 17/30233 |
| 2002/0032751 A1 | 3/2002 | Bharadwaj |
| 2002/0059451 A1 | 5/2002 | Haviv |
| 2002/0078174 A1 | 6/2002 | Sim et al. |
| 2002/0124079 A1 | 9/2002 | Pulsipher |
| 2002/0133491 A1 | 9/2002 | Sim et al. |
| 2002/0143984 A1 | 10/2002 | Hudson et al. |
| 2002/0156613 A1 | 10/2002 | Geng et al. |
| 2002/0174194 A1 | 11/2002 | Mooney et al. |
| 2003/0009480 A1 | 1/2003 | Lin et al. |
| 2003/0028514 A1 | 2/2003 | Lord et al. |
| 2003/0078946 A1 | 4/2003 | Costello et al. |
| 2003/0097454 A1 | 5/2003 | Yamakawa et al. |
| 2003/0158862 A1 | 8/2003 | Eshel |
| 2003/0177107 A1 | 9/2003 | Brown et al. |
| 2003/0182313 A1 | 9/2003 | Federwisch et al. |
| 2004/0049702 A1 | 3/2004 | Subramaniam et al. |
| 2004/0054850 A1 | 3/2004 | Fisk |
| 2004/0078467 A1 | 4/2004 | Grosner et al. |
| 2004/0123154 A1 | 6/2004 | Lippman et al. |
| 2004/0250113 A1 | 12/2004 | Beck |
| 2005/0010838 A1 | 1/2005 | Davies et al. |
| 2005/0075856 A1 | 4/2005 | Wozniak et al. |
| 2005/0125503 A1 | 6/2005 | Iyengar et al. |
| 2005/0193245 A1 | 9/2005 | Hayden et al. |
| 2006/0004765 A1 | 1/2006 | Anderson et al. |
| 2006/0015507 A1 | 1/2006 | Butterworth et al. |
| 2006/0015584 A1 | 1/2006 | Ocko et al. |
| 2006/0064474 A1 | 3/2006 | Feinleib et al. |
| 2006/0179037 A1 | 8/2006 | Turner |
| 2006/0206603 A1 | 9/2006 | Rajan et al. |
| 2006/0212481 A1 | 9/2006 | Stacey et al. |
| 2007/0022087 A1 | 1/2007 | Bahar |
| 2007/0022121 A1 | 1/2007 | Bahar |
| 2007/0022129 A1 | 1/2007 | Bahar |
| 2007/0038697 A1 | 2/2007 | Zimran et al. |
| 2007/0055703 A1 | 3/2007 | Zimran et al. |
| 2007/0083570 A1 | 4/2007 | Fineberg |
| 2007/0088702 A1 | 4/2007 | Fridella et al. |
| 2007/0094354 A1 | 4/2007 | Soltis |
| 2007/0156989 A1* | 7/2007 | Man et al. ............. 711/165 |
| 2007/0168046 A1 | 7/2007 | Misawa et al. |
| 2008/0010411 A1 | 1/2008 | Yang et al. |
| 2008/0040385 A1 | 2/2008 | Barrall et al. |
| 2008/0281908 A1 | 11/2008 | McCanne et al. |
| 2008/0294748 A1 | 11/2008 | Brown et al. |
| 2009/0043823 A1 | 2/2009 | Iftode et al. |
| 2009/0067440 A1 | 3/2009 | Chadda et al. |
| 2009/0150593 A1* | 6/2009 | Hamilton et al. ............ 711/101 |
| 2009/0182835 A1 | 7/2009 | Aviles et al. |
| 2009/0182836 A1* | 7/2009 | Aviles et al. ............... 709/213 |
| 2009/0182945 A1 | 7/2009 | Aviles et al. |
| 2009/0222509 A1 | 9/2009 | King et al. |
| 2009/0240784 A1 | 9/2009 | Soltis |
| 2009/0271412 A1 | 10/2009 | Lacapra et al. |
| 2009/0300739 A1 | 12/2009 | Nice et al. |
| 2010/0023674 A1 | 1/2010 | Aviles |
| 2010/0082774 A1 | 4/2010 | Pitts |
| 2010/0083675 A1 | 4/2010 | Merritt |
| 2010/0121945 A1 | 5/2010 | Gerber et al. |
| 2010/0217869 A1 | 8/2010 | Esteban et al. |
| 2010/0312861 A1 | 12/2010 | Kolhi et al. |
| 2010/0332401 A1 | 12/2010 | Prahlad et al. |
| 2011/0016085 A1 | 1/2011 | Kuo et al. |
| 2011/0022812 A1 | 1/2011 | van der Linden et al. |
| 2011/0066668 A1 | 3/2011 | Guarraci |
| 2011/0184907 A1 | 7/2011 | Schrock et al. |
| 2011/0196842 A1 | 8/2011 | Timashev et al. |
| 2011/0289287 A1* | 11/2011 | Yamamoto ............ G06F 3/0605 711/156 |
| 2011/0320436 A1* | 12/2011 | Hokanson ............... 707/719 |
| 2012/0005193 A1 | 1/2012 | Nemoto et al. |
| 2012/0011176 A1 | 1/2012 | Aizman |
| 2012/0016838 A1 | 1/2012 | Arai et al. |
| 2012/0041829 A1 | 2/2012 | Rothschild et al. |
| 2012/0059864 A1 | 3/2012 | Bandyopadhyay et al. |
| 2012/0117328 A1* | 5/2012 | McKean et al. ............ 711/136 |
| 2012/0150799 A1 | 6/2012 | Matsuzawa |
| 2012/0324110 A1 | 12/2012 | Kohli |
| 2013/0019301 A1 | 1/2013 | Reddy et al. |
| 2013/0054530 A1 | 2/2013 | Baker et al. |
| 2013/0097680 A1 | 4/2013 | Bendapudi et al. |
| 2013/0132544 A1 | 5/2013 | Krishnan et al. |
| 2013/0155902 A1 | 6/2013 | Feng et al. |
| 2013/0227048 A1 | 8/2013 | Xie et al. |
| 2013/0322298 A1 | 12/2013 | Alexander, Jr. et al. |
| 2013/0325804 A1 | 12/2013 | Bachar et al. |
| 2013/0339547 A1 | 12/2013 | Nath et al. |
| 2014/0052812 A1 | 2/2014 | Ozawa |
| 2014/0129667 A1 | 5/2014 | Ozawa |
| 2014/0165176 A1 | 6/2014 | Ow |
| 2014/0298454 A1 | 10/2014 | Heng et al. |
| 2015/0020059 A1 | 1/2015 | Davis |
| 2015/0207872 A1 | 7/2015 | Stiemerling et al. |

OTHER PUBLICATIONS

Yuanyuan Zhou, James Philbin, and Kai Li. 2001. The Multi-Queue Replacement Algorithm for Second Level Buffer Caches. In Proceedings of the General Track: 2001 USENIX Annual Technical Conference, Yoonho Park (Ed.). USENIX Association, Berkeley, CA, USA, 91-104.*

International Search Report and Written Opinion, mailed Dec. 11, 2014, for related application PCT/US2014/053011, filed Aug. 27, 2014, 10pages.

Office Action mailed Feb. 11, 2015, for related U.S. Appl. No. 14/011,723, filed Aug. 27, 2013, 15 pages.

B. Pawlowski, C. Juszczak, P. Staubach, C. Smith, D. Lebel, and D. Hitz, NFS version 3: Design and implementation. In Proceedings of the Summer 1994 USENIX Technical Conference, 15 pages, pp. 137-151, 1994. Retrieved from the Internet http://people.cs.pitt.edu/-manas/courses/251 O/nfs3.pdf.

Office Action mailed May 12, 2015, for related U.S. Appl. No. 14/011,699, filed Aug. 27, 2013, 27 pages.

Office Action mailed Aug. 28, 2015, for related U.S. Appl. No. 14/011,699, filed Aug. 27, 2013, 26 pages.

Office Action mailed Jun. 18, 2015, for related U.S. Appl. No. 14/011,696, filed Aug. 27, 2013, 25 pages.

Office Action mailed Jun. 18, 2015, for related U.S. Appl. No. 14/011,719, filed Aug. 27, 2013, 18 pages.

Office Action mailed Jun. 16, 2015, for related U.S. Appl. No. 14/011,718, filed Aug. 27, 2013, 27 pages.

Office Action mailed Jul. 8, 2015, for related U.S. Appl. No. 14/011,723, filed Aug. 27, 2013, 13 pages.

Microsoft Press. 2002. Microsoft Computer Dictionary, Fifth Edition (5th ed.). p. 348, Microsoft Press, Redmond, WA, USA.

Final Office Action mailed Aug. 19, 2015, for related U.S. Appl. No. 14/031,023, filed Sep. 18, 2013, 32 pages.

Non-Final Office Action mailed Apr. 9, 2015, for related U.S. Appl. No. 14/031,023, filed Sep. 18, 2013, 29 pages.

(56) References Cited

OTHER PUBLICATIONS

Notice of Allowance mailed Nov. 6, 2015, for related U.S. Appl. No. 14/011,723, filed Aug. 27, 2013, 11 pages.
Li J., et al., "Managing Data Retention Policies at Scale," Network and Service Management, IEEE Transactions on, Browse Journals & Magazines Network & Service Man, vol. 9 (4), Oct. 19, 2012, pp. 393-406.
Non-Final Office Action mailed Nov. 20, 2015 for U.S. Appl. No. 14/031,018 filed Sep. 18, 2013, 28 pages.
Notice of Allowance mailed Dec. 10, 2015 for U.S. Appl. No. 14/011,718 filed Aug. 27, 2013, 13 pages.
Notice of Allowance mailed Dec. 15, 2015 for U.S. Appl. No. 14/011,719 filed Aug. 27, 2013, 14 pages.
Notice of Allowance mailed Dec. 3, 2015 for U.S. Appl. No. 14/011,696 filed Aug. 27, 2013, 15 pages.
Reed B.C., et al., "Security Considerations When Designing a Distributed File System Using Object Storage Devices," FirstInternational Security in Storage Workshop, URL: http://ieeexplore.ieee.org/stamp/stamp.jsp?tp=&arnumber=1183507, 2002, pp. 24-34.
Veeraraghavan K., et al., "DoublePlay: Parallelizing Sequential Logging and Replay," Journal ACM Transactions Computer Systems (TOGS), Special Issue APLOS 2011 TOGS Homepage archive, vol. 30 (1), Feb. 2012, pp. 3:1-3:24.
You I., "On Asynchronous Enforcement of Security Policies in "Nomadic" Storage Facilities," Published in: Industrial Electronics (ISIE), 2013 IEEE International Symposium on, May 28-31, 2013, pp. 1-6.
Non-Final Office Action mailed Dec. 17, 2015, for related U.S. Appl. No. 14/031,019, filed Sep. 18, 2013, 31 pages.

\* cited by examiner

SYSTEM AND METHOD FOR OPERATING A SYSTEM TO CACHE A NETWORKED FILE SYSTEM UTILIZING TIERED STORAGE AND CUSTOMIZABLE EVICTION POLICIES BASED ON PRIORITY AND TIERS

RELATED APPLICATIONS

This patent application claims benefit of priority to (i) Provisional U.S. Patent Application No. 61/702,694, (ii) Provisional U.S. Patent Application No. 61/702,695, (iii) Provisional U.S. Patent Application No. 61/702,687, (iv) Provisional U.S. Patent Application No. 61/702,690, and (v) Provisional U.S. Patent Application No. 61/702,692; all of the aforementioned priority applications being hereby incorporated by reference in their respective entirety for all purposes.

TECHNICAL FIELD

Examples described herein relate to a system and method for operating a system to cache a networked file system.

BACKGROUND

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where anyone NAS device may be connected to a plurality of clients. In part, this performance problem is caused by the lower cache hit rates that result from a combination of larger and constantly changing active data sets and large number of clients mounting the NAS storage device.

DETAILED DESCRIPTION

Figure 1:
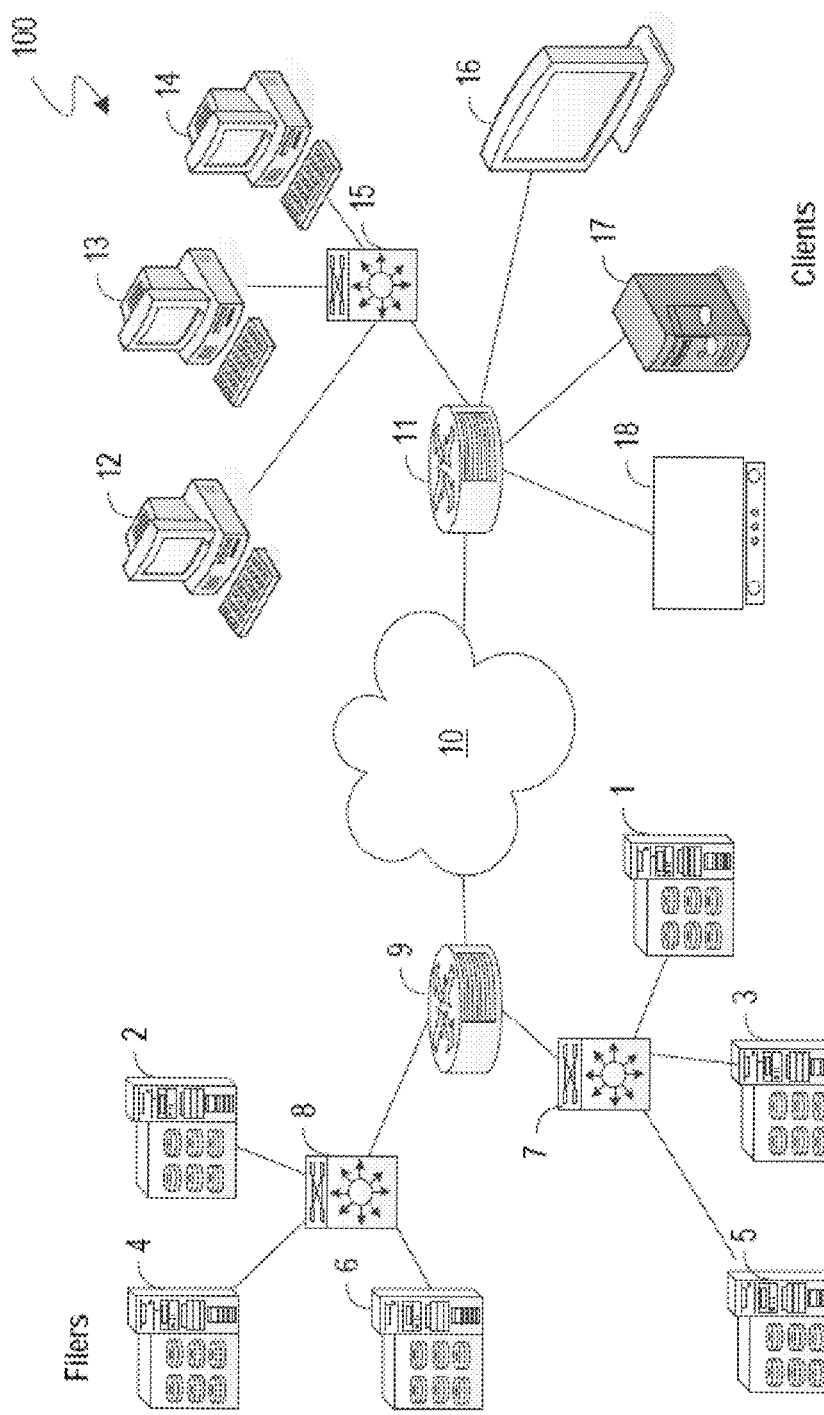
FIG. 1 depicts a prior art NAS system.

Examples described herein include a network attached storage (NAS) caching appliance, system, and associated method of operation for caching a networked file system. Still further, some embodiments provide for a cache system that implements a mufti-tiered, policy-influenced block replacement algorithm.

In particular, replacement algorithms described in accordance with some examples balance access frequency of cached data sets with customer-defined importance. Additionally, some examples include a NAS cache appliance that includes a replacement cache manager to implement a ranked priority multi-queue replacement (RPMQ) algorithm Among other benefits, a high-performance network attached storage (NAS) caching appliance can be provided for a networked file system to deliver enhanced performance to I/O intensive applications, while relieving overburdened storage subsystems. The examples described herein identify the active data sets of the networked system and use predetermined policies to control what data gets cached using a combination of DRAM and SSDs to improve performance, including guaranteeing the best performance for the most important applications. Examples described herein can further be positioned between the storage clients and the NAS filers, to intercept requests between the clients and filers, and to provide read and write cache acceleration by storing and recalling frequently used information. In some embodiments, the NAS caching system includes one or more flow director appliances and cache node appliances connected over an interconnect system bus. The NAS caching system uses the interconnect system bus to address the cache node appliance(s) and flow director appliance(s), and to monitor and respond to system health events/changes at the NAS caching system, such as failures at a flow director appliance, cache node appliance, and/or interconnect bus.

Examples described herein provide for a high-performance network attached storage (NAS) caching appliance and system. In an embodiment, a NAS cache appliances manages the interconnect busses connecting one or more flow directors and cache node appliances, in order to monitor and respond to system health events/changes. In some embodiments, each of the NAS cache appliances includes an interconnect bus manager that provides address configuration and monitoring functions for each NAS cache appliance.

In addition, a computer program product is disclosed that includes a non-transitory computer readable storage medium having computer readable program code embodied therein with instructions which are adapted to be executed to implement a method for operating a NAS caching appliance, substantially as described hereinabove. In selected embodiments, the operations described herein may be implemented using, among other components, one or more processors that run one or more software programs or modules embodied in circuitry and/or non-transitory storage media device(s) (e.g., RAM, ROM, flash memory, etc.) to communicate to receive and/or send data and messages. Thus, it will be appreciated by one skilled in the art that the present invention may be embodied in whole or in part as a method, system, or computer program product. For example, a computer-usable medium embodying computer program code may be used, where the computer program code comprises computer executable instructions configured to use the interconnect bus to monitor appliance failures using gratuitous ARP or heartbeat messages and respond to any failures at the interconnect bus or other system appliance. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

In selected embodiments, the operations described herein may be implemented using, among other components, one or more processors that run one or more software programs or modules embodied in circuitry and/or non-transitory storage media device(s) (e.g., RAM, ROM, flash memory, etc.) to communicate to receive and/or send data and messages. Thus, it will be appreciated by one skilled in the art that the present invention may be embodied in whole or in part as a method, system, or computer program product. For example, a computer-usable medium embodying computer program code may be used, where the computer program code comprises computer executable instructions configured to provide dynamically detect and select file servers associated with a requested caching operation. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Figure 2:
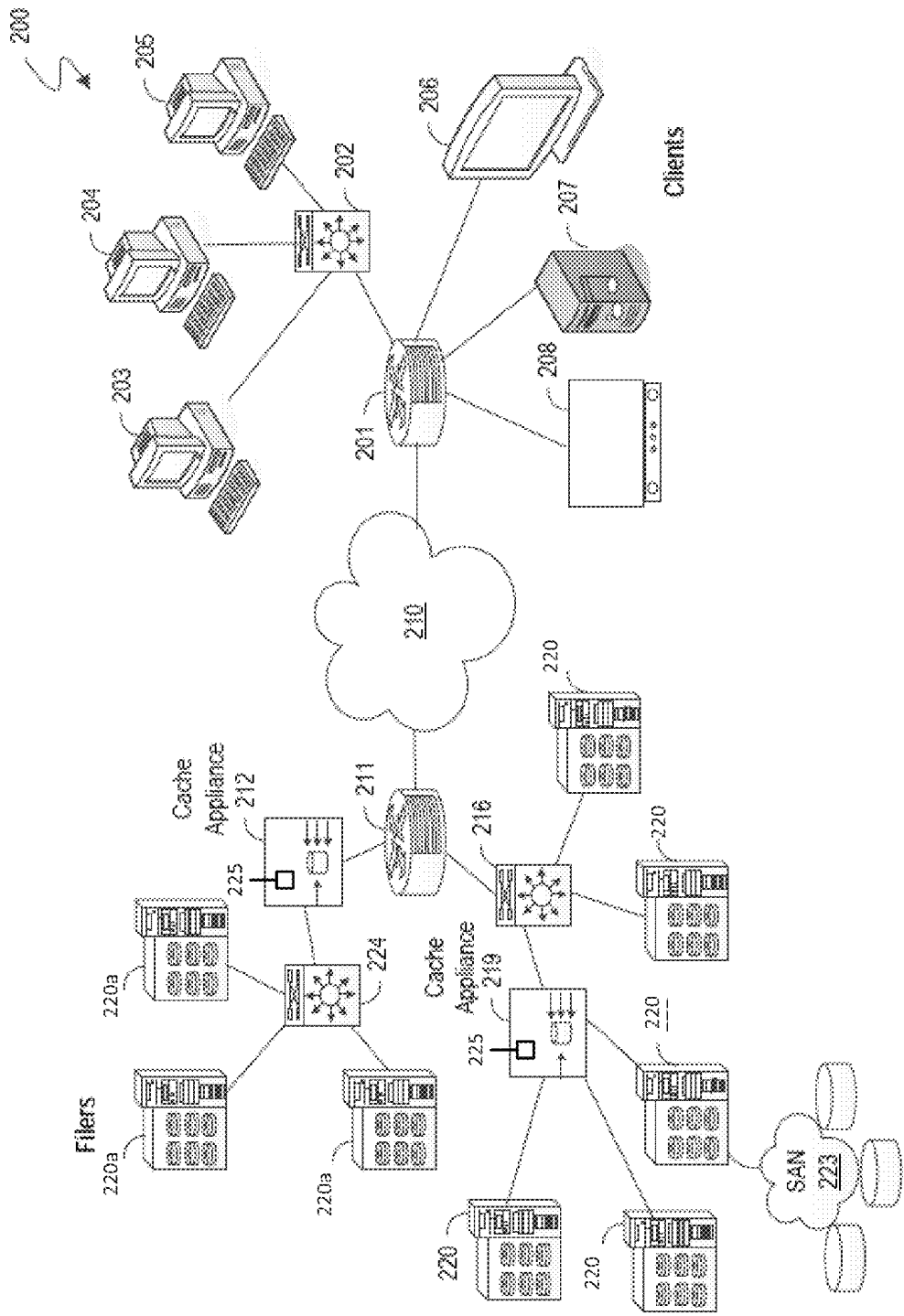
FIG. 2 illustrates an example of a networked system that utilizes intelligent, cache appliances, including topology detection logic, according to an embodiment.

FIG. 2 illustrates an example of a networked system that utilizes cache appliances that include a replacement cache manager, according to an embodiment. In an example of FIG. 2, an enterprise network system 200 includes multiple file system servers 220 and file system server groups 220a that collectively operate as one or more NAS filers of the enterprise file system 200. The system 200 includes one or more cache appliances 212, 219 located in front of a file system server 220 and/or file system server groups 220a. One or more clients 203-205 or 206-208 connect to and utilize the enterprise file system 200. In the example provided, clients 203-205 correspond to, for example, mobile or desktop PCs or workstations, and clients 206-208 correspond to application servers (collectively termed "clients 203-208"). Each of the clients 203-208 may run a separate application which requires access to remotely-stored application data. In operation, a requesting client sends a read or write request over the network 210 using the appropriate routers 201, 211 and/or switches 202, 216, 224. Such requests may be directed to the destination NAS filer using an appropriate IP-based network protocol, such as, for example, CIFS or NFS.

According to examples described herein, the cache appliances 212, 219 are disposed logically and/or physically between at least some clients 203-208 and the file system server 220 and/or filer server groups 220a of the NAS filer. In more detail the cache appliances 212, 219 include intelligent cache appliances which are installed in-line between individual clients 203-208 and the destination NAS filer. The individual clients 203-208 issue requests for a respective NAS filer provided with the system 200. Such requests can include read or write requests in which file system objects of the respective NAS filer is used. More specifically, examples described herein provide for the cache appliances 212, 219 to (i) store a segment of the data of the NAS filer, and (ii) process requests from the clients 203-208 directed to the NAS filer. The cache appliances 212, 219 can each include programmatic resources to optimize the handling of requests from the clients 203-208 in a manner that is transparent to the clients 203-208. In particular, the cache appliances 212, 219 can respond to individual client requests, including (i) returning up-to-date but cached application data from file system objects identified from the client requests, and/or (ii) queuing and then forwarding, onto the NAS filer, write, modify or create operations (which affect the NAS filer), and subsequently updating the contents of the respective cache appliances 212, 219. In general, the cache appliances 212, 219 enable the individual client requests to be processed more quickly than would otherwise occur if the client requests were processed from the disk arrays or internal cache memory of the file system servers. More generally, the cache appliances 212, 219 can be positioned in-line to cache the NAS filer without requiring the clients 203-208 to unmount from the NAS filer.

In an example of FIG. 2, each cache appliance 212, 219 can include one or more cache appliances that are connected together and working in tandem to form a single homogeneous caching device. Examples of cache appliances 212, 219 are provided with embodiments described with FIG. 3 through FIG. 6, as well as elsewhere in this application. Furthermore, in an example of FIG. 2, each cache appliance 212, 219 can include an appliance that is constructed as a high-speed packet processor with a substantial cache memory. For example, each cache appliance 212, 219 can correspond to an appliance that includes a set of network processing resources (such as a network switch and network processor(s)), a dynamic cache memory, a non-volatile cache memory and/or cache controller(s). The processing resources of the individual cache appliances 212, 219 can be configured to handle, for example, NFS type requests from the clients 203-208.

As further shown by an example of FIG. 2, individual cache appliances 212, 219, can be installed in multiple different locations of the system 200. In this manner, the individual cache appliances 212, 219 provide caching resources for one or more NAS filers, as shown by the placement of the cache appliance 219 in relation to file servers 220, or alternatively, to a group of NAS filers as shown by the placement of the cache appliance 212 in relation to the NAS filers provided by the file servers 220 and file server groups 220a. However positioned, the cache appliances 212, 219 each operate to intercept requests between the clients and the servers 220. In this way, the cache appliances 212, 219 are able to provide read and write cache acceleration by storing and recalling frequently used information. In some embodiments, the cache appliances 212, 219 are positioned as part of a required path between a respective file server and some or all of the clients. In particular, the cache appliances 212, 219 are positioned to intercept traffic directed from clients 203-208 to a particular file server 220 or set of file servers 220a in order to avoid cache coherency problems. In particular, cache coherency problems can arise when a piece of information stored with cache appliance 212, 219 is modified through an alternate path.

As described with some examples, each cache appliance 212, 219 can be provided with packet inspection functionality. In this way, each cache appliance 212, 219 are able to inspect the information of each of the intercepted packets in each of the TCP/IP stack layers. Through packet inspection, cache appliances 212, 219 can determine (i) the physical port information for the sender and receiver from the Layer 2 (data link layer), (ii) the logical port information for the sender and receiver from the Layer 3 (network layer), (iii) the TCP/UDP protocol connection information from the Layer 4 (transport layer), and (iv) the NSF/CIFS storage protocol information from the Layer 5 (session layer). Additionally, some embodiments provide that the cache appliances 212, 219 can perform packet inspection to parse and extract the fields from the upper layers (e.g., Layer 5-Layer 7). Still further, some embodiments provide that the packet inspection capability enables each cache appliance 212, 219 to be spliced seamlessly into the network so that it is transparent to the Layer 3 and Layer 4 layers.

According to embodiments, the cache appliances 212, 219 can accelerate responses to storage requests made from the clients. In particular, the packet inspection capability enables each cache appliance 212, 219 to be spliced seamlessly into the network so that it is transparent to the Layer 3 and Layer 4 layers and only impacts the storage requests by processing them for the purposes of accelerating them, i.e., as a bump-in-the-wire. Rather than splicing all of the connection parameters in the Layer 2, Layer 3 and Layer 4, some embodiments provide that each cache appliance 212, 219 can splice only the connection state, source sequence number and destination sequence number in Layer 4. By leaving unchanged the source and destination MAC addresses in the Layer 2, the source and destination IP addresses in the Layer 3 and the source and destination port numbers in the Layer 4, the cache appliances 212, 219 can generate a programmatic perception that a given client 203-208 is communicating with one of the NAS filers of the enterprise network system 200. As such, there is no awareness at either the clients 203-208 or file servers 220, 220a of any intervening cache appliance 212, 219. In this way, the cache appliances 212, 219 can be inserted seamlessly into an existing connection with the clients 203, 208 and the NAS filer(s) provided with the system 200, without requiring the clients to be unmounted. Additionally, among other benefits, the use of spliced connections in connecting the cache appliances 212, 219 to the file servers 220 and file server groups 220 enable much, if not all, of the data needs of the individual clients to be served from the cache, while providing periodic updates to meet the connection timeout protocol requirements of the file servers 220.

In more detail, the cache appliance 212, 219 can process a read or write request by making only Layer 1 and Layer 2 configuration changes during installation or deployment. As a result, no filer or client configuration changes are required in order to take advantage of the cache appliance. With this capability, an installed cache appliance 212, 219 (e.g., appliance) provides a relatively fast and transparent storage caching solution which allows the same connections to be maintained between clients and filers. As described with some embodiments, if there is a failure at the cache appliance 212, 219, the cache appliance automatically becomes a wire (e.g., pass through) between the client and filer who are able to communication directly without any reconfiguration.

According to some embodiments, cache appliance 212, 219 are implemented as a network attached storage (NAS) cache appliance, and connected as an in-line appliance or software that is positioned in the enterprise network system 200 to intercept requests to one or more of the file servers 220, or server groups 220a. This configuration provides clients 203-208 expedited access to the data within the requested files, so as to accelerate NAS storage performance. As an appliance, cache appliances 212, 219 can provide acceleration performance by storing the data of the NAS filers (provided from the file servers 220 and server groups 220a) in high-speed media. In some embodiments, cache appliances 212, 219 are transparently installed appliances, deployed between the clients 203-208 and file system servers 220, 220a without any network or reconfiguration of the endpoints. Without client or file server configuration changes, the cache appliances 212, 219 can operate intelligently to find the active dataset (or a designated dataset) of the NAS filers, and further to copy the active data sets into DRAM and SSD memory. The use of DRAM and SSD memory provides improvement over conventional type memory used by the file servers. For example, in contrast to conventional approaches, embodiments described herein enable cache appliances 212, 219 to (i) operate independently, (ii) operate in a manner that is self-contained, (iii) install in-line in the network path between the clients and file servers. Knowing the contents of each packet allows data exchanged with the file servers 220, 220a (e.g., NFS/CIFS data) to be prioritized optimally the first time the data is encountered by the cache appliances, rather than being moved after-the-fact.

As described with some examples provided with FIG. 7 through FIG. 11, each of cache appliance 212, 219 includes replacement cache managers 225 that manage the ranking and priority of cached data. In Among other operations, the replacement cache managers utilize access frequency and user-defined policies to configure cache management or replacement algorithms. Examples of cache management and replacement algorithms are provided with FIG. 7 through FIG. 10.

Figure 3:
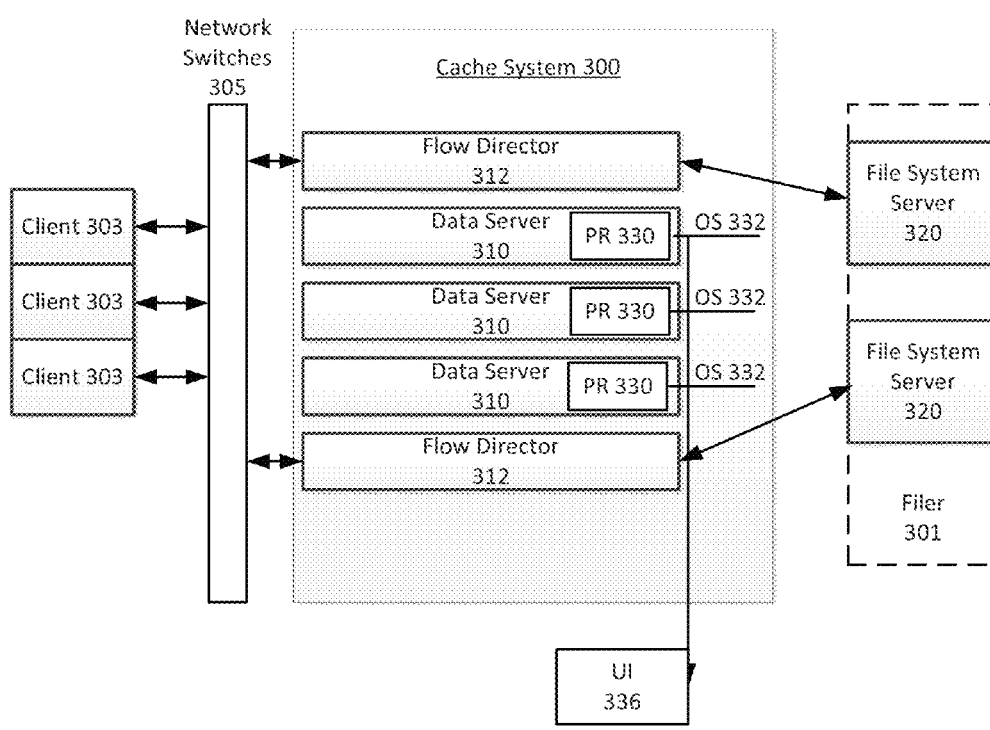
FIG. 3 illustrates an example of a cache system for use with a system such as described with FIG. 2.

FIG. 3 illustrates an example of a cache system for use with a system such as described with FIG. 2. In particular, FIG. 3 illustrates a cache system 300 that includes multiple data servers 310 and flow directors 312. In this way, the cache system 300 can include multiple appliances, including NAS cache appliances. The cache system 300 utilizes network switches 305 to connect to clients 303 across one or more networks. In implementation, the components of the cache system 300 (e.g., data servers 310, flow directors 312) can be positioned in-line with respect to clients 303 and file system servers 320 of a networked system 301. Accordingly, connectivity between the clients 303 and the cache system 300, as well as between the cache system 300 and the file system servers 320 of the networked system 301, can be across one or more networks. The networked system 301 can correspond to, for example, a combination of file system servers of the networked system, as described with an example of FIG. 2 (e.g., see network system 200 of FIG. 2).

According to one aspect, the cache system 300 includes one or more data servers 310, one or more flow directors 312, and processing resources 330. In some implementations, the processing resources 330 that coincide with resources of the data servers 310 implement a cache operating system 332. Additionally, the processing resources 330 can perform various analytic operations, including recording and/or calculating metrics pertinent to traffic flow and analysis.

In some embodiments, the data server 310 implements operations for packet-inspection, as well as NFS/CIFS caching. Multiple data servers 310 can exist as part of the cache system 300, and connect to the file servers 320 of the networked system 301 through the flow director(s) 312. The flow director(s) 312 can be included as active and/or redundant devices to interconnect the cache system 300, so as to provide client and file server network connectivity for filer 301.

The cache operating system 332 can synchronize the operation of the data servers 310 and flow directors 312. In some embodiments, the cache operating system 332 uses active heartbeats to detect node failure (e.g., failure of one of the data servers 310). If a node failure is detected, the cache operating system 332 removes the node from the cache system 300, then instructs remaining nodes to rebalance and redistribute file responsibilities. If a failure is detected from one of the flow directors 312, then another redundant flow director 312 is identified and used for redirected traffic.

In one implementation, a user interface 336 can be implemented through the processing resources 330. The user interface 336 can be implemented as, for example, a web-interface. The processing resources 330 can be used to gather and view statistics, particularly as part of the operations of the data server 310 and the flow director 312. The user interface 336 can be used to display metrics and statistics for purpose of, for example, troubleshooting storage network issues, and configuring the NAS cache system 300. For example, administrators can use the user interface 336 to view real-time information on cache performance, policy effectiveness, and application, client, and file server performance.

According to some embodiments, the data servers 310 include packet inspection and NFS/CIFS caching infrastructure for the cache system 300. In one implementation, the data servers 310 utilize multiple cache media to provide different performance levels. For example, in some embodiments, each data server 310 supports DDR3 DRAM and high performance SSD storage for caching. In operation, data servers 310 communicate with both clients 303 and file system servers 320, by, for example, inspecting every message and providing the information necessary to intelligently cache application data.

In some embodiments, the data servers 310 can be implemented in a manner that is extensible, so as to enable expansion and replacement of data servers 310 from the cache system 300. For example, each data server 310 can employ hot swappable power supplies, redundant fans, ECC memory and enterprise-level Solid State Disks (SSD).

Further, in some embodiments, the flow directors 312 operate as an enterprise-level Ethernet switch (e.g., 10 GB Ethernet switch). The flow directors 312 can further be implemented with software so as to sit invisibly between clients 303 and file system servers 320. In the cache system 300, the flow director 312 load balances the data severs 310. The individual flow directors 312 can also provide the ingress and egress point to the network. Additionally, the flow directors 312 can also filter traffic that passes through non-accelerated protocols. In some implementations, flow directors 312 work in concert with the operating system 332 to provide failover functionality that ensures access to the cached data is not interrupted.

In some embodiments, the flow directors 312 can also operate so that they do not participate in switching protocols between client and file server reciprocal ports. This allows protocols like Spanning Tree (STP) or VLAN Trunking Protocol (VTP) to pass through without interference. Each flow director 312 can work with the data servers 310 in order to support, for example, the use of one or more of Link Aggregation (LAG) protocols, 802.1Q VLAN tagging, and jumbo frames. Among other facets, the flow directors 312 can be equipped with hot swappable power supplies and redundant fans. Each flow director 312 can also be configured to provide active heartbeats to the data servers 310. In the event that one of the flow directors 312 becomes unresponsive, an internal hardware watchdog component can disable client/file server ports in order to facilitate failover on connected devices. The downed flow director 312 can then be directed to reload and can rejoin the cache system 300 if once again healthy.

Figure 4:
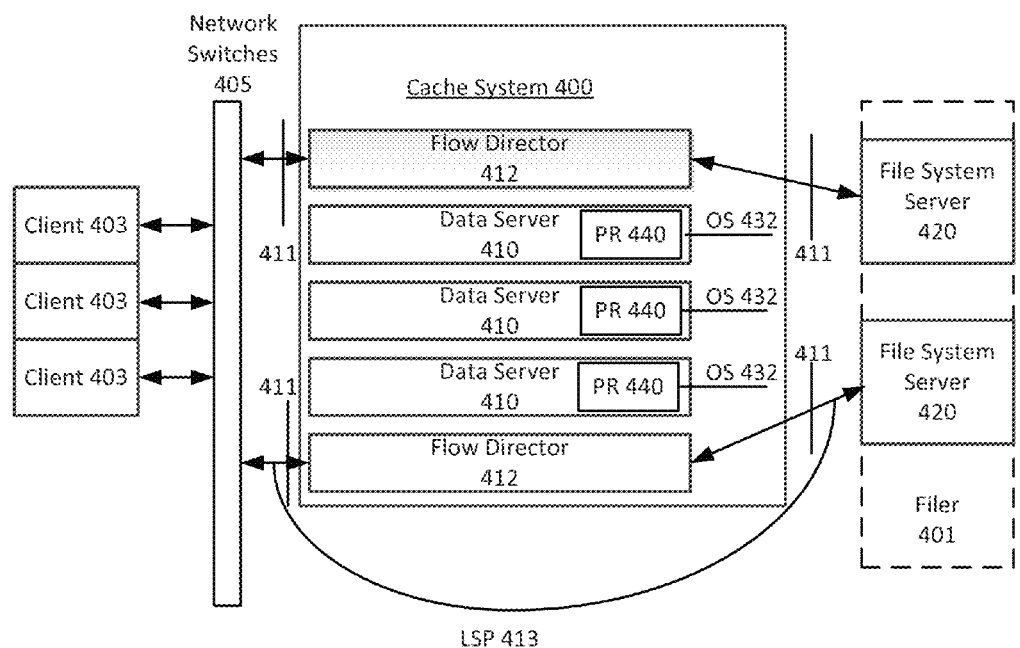
FIG. 4 illustrates another example of a cache system for use with a system such as described with FIG. 2.

FIG. 4 illustrates another example of a cache system for use with a system such as described with FIG. 2. In particular, FIG. 4 illustrates a cache system 400 that includes multiple data servers 410, flow directors 412 and processing resources 430 on which an operating system 432 can be implemented. In this way, the cache system 300 can include multiple appliances, including NAS cache appliances. The cache system 400 utilizes network switches 405 to connect to clients 403 across one or more networks. In implementation, the cache system 400 can be positioned in-line with respect to clients 403 and file system servers 420 of a networked system 401. Accordingly, connectivity between the clients 403 and the cache system 400, as well as between the cache system 400 and the file system servers 420 of the networked system 401, can be across one or more networks. As with an example of FIG. 3, the networked system or filer 401 can correspond to, for example, a combination of file system servers 420 that provide one or more NAS filers, as described with an example of FIG. 2 (e.g., see system 200 of FIG. 2).

In an example of FIG. 4, the flow directors 412 and data server 410 support 802.1Q VLAN tagging connections 411 to the client-side switch and the file servers. The data servers 410 operate to maintain the connection state between the clients 403 and file servers 420 of the filer, so that network traffic can flow indiscriminately through either of the flow directors 412. In this way, the flow directors 412 are essentially equal bidirectional pathways to the same destination. As a result, any link failover is negotiated between the client switch and individual file servers, with the operating system 432 facilitating failover with Link State Propagation (LSP) communications 413 and link aggregation protocols. In this arrangement, the flow director(s) 412 provide an LSP feature for the in-line cache system 400 to maintain end-to-end link state between the client switch and file server. Since, in the example provided with FIG. 4, the flow director(s) 412 are physically located between these devices, these flow directors actively monitor reciprocal connections so both client-side and file server-side connections are in sync. This allows implementation of the LAG protocol (if employed) to dynamically adjust in case of link failure.

Figure 5:
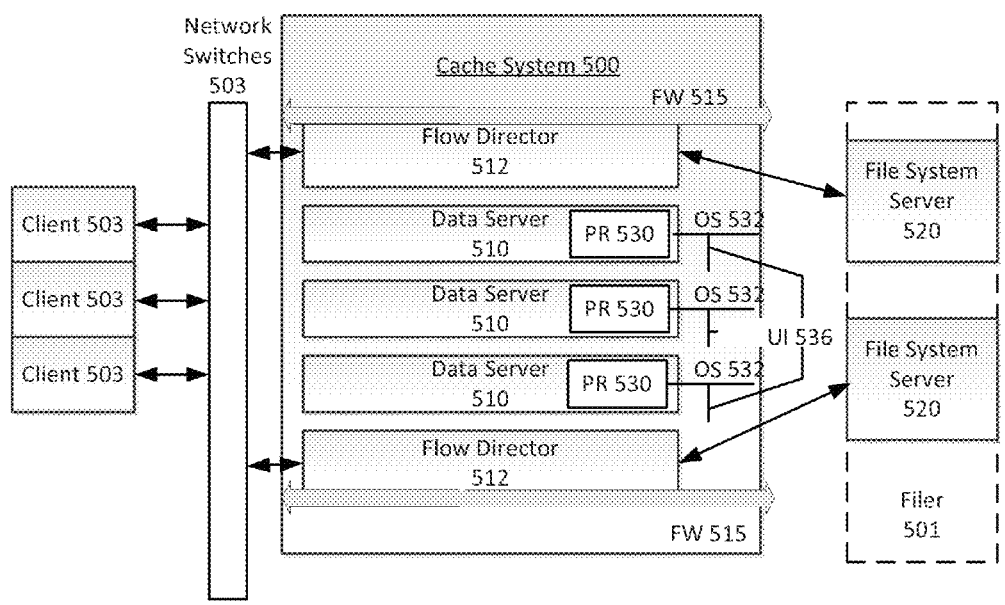
FIG. 5 illustrates another example of a cache cluster for use with a system such as described with FIG. 2.

FIG. 5 illustrates another example of a cache cluster for use with a system such as described with FIG. 2. In an example of FIG. 5, an in-line NAS cache system 500 includes two (or more) flow directors 512, a supporting data server 510, and processing resources 530 on which an operating system 532 can be implemented. In this way, the cache system 500 can include multiple appliances, including NAS cache appliances. The cache system 500 utilizes network switches 505 to connect to clients 503 across one or more networks. In implementation, the cache system 500 can be positioned in-line with respect to clients 503 and file system servers 520 of a networked system 501. Accordingly, connectivity between the clients 503 and the cache system 500, as well as between the cache system 500 and the file system servers 520 of the networked system 501, can be across one or more networks. As with an example of FIG. 3, the networked system or filer 501 can correspond to, for example, a combination of file system servers 520 that provide one or more NAS filers, as described with an example of FIG. 2 (e.g., see system 200 of FIG. 2).

The data servers 510 can be connected between individual file system servers 520 and a client-side switch for some of the clients 503. As depicted, the flow directors 512 and data server 510 provide a fail-to-wire pass through connection 515. The connection 515 provides a protection feature for the in-line cache system 500 in the event that the data servers 510 fail to maintain heartbeat communications. With this feature, the flow director(s) 512 are configured to automatically bypass the data server(s) 510 of the cache system in case of system failure. When bypassing, the flow directors 512 send traffic directly to the file system servers 520. Using active heartbeats, the flow directors 512 can operate to be aware of node availability and redirect client requests to the file system server 520 when trouble is detected at the cache system.

A bypass mode can also be activated manually through, for example, a web-based user interface 536, which can be implemented by the processing resources 530 of the cache system 500. The active triggering of the bypass mode can be used to perform maintenance on data server nodes 510 without downtime. When the administrator is ready to reactivate the cache system 500, cached data is revalidated or flushed to start with a "clear cache" instruction.

Figure 6:
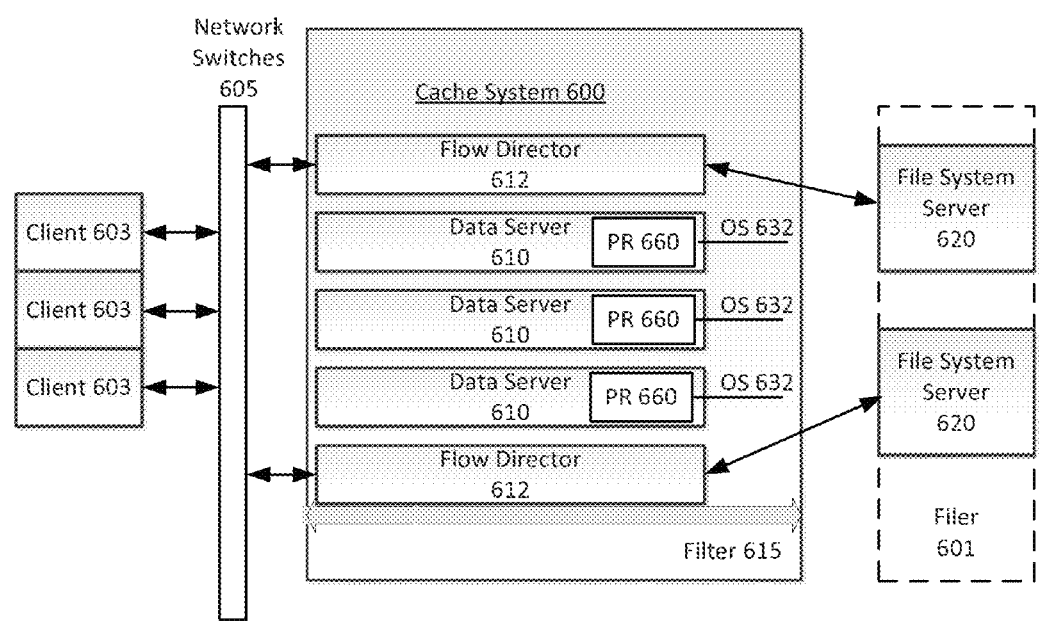
FIG. 6 illustrates another example of a cache system for use with a system such as described with FIG. 2.

FIG. 6 illustrates another example of a cache system for use with a system such as described with FIG. 2. In an example of FIG. 6, an in-line cache system 600 includes two (or more) flow directors 612 and one or more supporting data servers 610. In this way, the cache system 600 can include multiple appliances, including NAS cache appliances. The cache system 600 utilizes network switches 605 to connect to clients 603 across one or more networks. The data server 610 can be connected between one of the file system servers 620 of the NAS filer 601 and clients 603 (including iSCSI clients). In implementation, the cache system 600 can be positioned in-line with respect to clients 603 and file system servers 620 of a networked system 601. Accordingly, connectivity between the clients 603 and the cache system 600, as well as between the cache system 600 and the file system servers 620 of the networked system 601, can be across one or more networks. As with an example of FIG. 3, the networked system or filer 601 can correspond to, for example, a combination of file system servers 620 that provide one or more NAS filers, as described with an example of FIG. 2 (e.g., see system 200 of FIG. 2).

As depicted, the flow directors 612 and data server 610 of the cache system 600 provide a low latency, wire-speed filtering feature 615 for the in-line cache system 600. With filtering feature 615, the flow director(s) 612 provide advanced, low-latency, wire-speed filtering such that the flow director filters only supported-protocol traffic to the system. Substantially all (e.g., 99%) other traffic is passed straight to the file system servers 620 of the NAS filer 601, thereby ensuring that the data servers 610 focus only on traffic that can be cached and accelerated.

In support of the various features and functions described herein, each cache system 600 implements operating system 632 (IQ OS) (e.g., FreeBSD) to be customized with a purpose built caching kernel. Operating across all data servers and interacting with flow directors in the cache system, the OS 632 serves basic functions that include network proxy, file object server, and generic storage access. As a network proxy between clients and file servers, the OS 632 performs Layer 2 topology discovery to establish what is physically connected. Once the topology is determined, it maintains the network state of all connections. As requests are intercepted, the requests are converted to NAS-vendor independent file operations, streamlining the process while allowing the cache system 600 to incorporate other network protocols in the future.

Once requests are converted, the cache appliance system 600 handles generic metadata operations, and data operations are mapped to virtual devices. Virtual devices can be implemented with DRAM, flash memory, and/or other media, and are categorized according to their performance metrics, including latency and bandwidth. Virtualization of devices allows the OS 632 to easily incorporate faster media to further improve performance or denser media to add cache capacity. Once the media hierarchy or tier is established within the cache resources of the system 600, blocks are promoted and demoted based on frequency of use, unless "pinned" to a specific tier by the administrator. Additionally, in some implementations, the data servers 610 can operate a policy engine, which can implement user-defined polices, and proactively monitor the tiers of cache and prioritize the eviction of data blocks.

In one implementation, the cache system 600 may include a DRAM virtual tier where metadata is stored for the fastest random I/O access. In the DRAM virtual tier, user-defined profiles can be "pinned" for guaranteed, consistent access to critical data. SWAP files, database files, and I/O intensive virtual machine files (VMDKs) are a few examples of when pinning data in DRAM can provide superior performance.

In addition or in the alternative, some implementations provide that each cache system 600 may include a virtual tier for Solid State Disks (SSD) which can be added at any time to expand cache capacity. To maximize performance and capacity, individual SSDs are treated as an independent virtual tier, without RAID employment. In the event of a failed SSD, the overall cache size will shrink only by the missing SSD. The previously cached data will be retrieved from the file server (as requested) and stored on available media per policy.

Using packet inspection functionality of the data server 610, the OS 632 at the cache system 600 learns the content of data streams, and at wire-speed, makes in-flight decisions based on default or user-defined policies to efficiently allocate high-performance resources where and when they are required most. Because data is initially stored to its assigned virtual tier, blocks are moved less frequently, which increases overall efficiency. However, as data demands change, the OS 632 also considers frequency of use to promote or demote blocks between tiers (or evict them completely out of cache).

In support of the caching operations, each cache system 600 can include one or more default built-in policies which assign all metadata to the highest tier (currently DRAM) and all other data to a secondary pool with equal weight. Frequency of use will dictate if data is to be migrated between tiers. And with no user-defined profiles enabled, the default policy control caching operations. In addition, one or more file policies may be specified using filenames, file extensions, file size, file server, and file system ID (FSID) in any combination with optional exclusions. An example file policy would be to "cache all *.dbf files less that 2 GB from file server 192.168.2.88 and exclude file201.dbf." Client policies may also use IP addresses or DNS names with optional exclusions to specify cache operations. An example client policy would be to "cache all clients in IP range: 192.168.2.0/24 and exclude 192.168.2.31"

As will be appreciated, one or more cache policy modifiers may be specified, such as a "quota" modifier which imposes a limit on the amount of cache a policy consumes and can be specified by size or percent of overall cache. Quota modifiers can be particularly useful in multitenant storage environments to prevent one group from over-consuming resources. In addition, a "schedule" modifier may be used to define when a policy is to be activated or disabled based on a time schedule. An example, the cache system 600 can activate the "Nightly Software Build" profile at 9 pm and disable at 6 am. Another policy modifier referenced above is a user-created exception to "pin" data to a particular tier or the entire cache. A pinned policy means other data cannot evict the pinned data—regardless of frequency of use. Such a policy can be useful for data that may not be accessed often, but is mission-critical when needed. In busy environments that do not support pinning, important but seldom used data will never be read from cache because soon after it is cached, the data is evicted before it is needed again. Pinned policies can address this unwanted turnover. Yet another modifier is a "Don't Cache" modifier which designates by file name of client request selected data that is not to be cached. This option can be useful when dealing with data that is only read once, not critical, or which may change often. As another example, a "priority" modifier may be used to manually dictate the relative importance of policies to ensure data is evicted in the proper order. This allows user-defined priorities to assign quality of service based on business needs.

Using the cache policies and modifiers, the cache behavior of the cache system 600 can be controlled to specify data eviction, migration, and multi-path support operations. For example, the cache system 600 can make an eviction decision based on cache priority from lowest to highest (no cache, default, low, high, and pin), starting with the lowest and moving to higher priority data only when the tier is full. In one implementation, eviction from cache resources of the cache system 600 can be based on priority, and then usage. For example, the lowest priority with the least accessed blocks will be evicted from cache first, and the highest priority, most used blocks will be evicted last.

The cache system 600 can also control the migration of data within the cache based strictly by usage, so that the most active data, without regard to priority, will migrate to the fastest cache tier. Likewise, as other data becomes more active, stale data will be demoted. Data pinned to a specified tier is excluded from migration.

In some implementations, the cache system 600 can also include a Mufti-Path Support (MPS) mechanism for validating the data in the cache resources of the cache system 600. With the MPS mechanism, the NAS cache checks backend file server attributes at a configurable, predefined interval (lease time). Data may change when snap-restoring, using multiprotocol volumes (i.e., CIFS, NFSv2/4), or if there are clients directly modifying data on the backend file server. When a client reads a file, MPS evaluates its cache lease time to determine whether it needs to check file server attributes. If not expired, the read will be served immediately from cache. If expired, MPS checks the backend file server to confirm no changes have occurred. If changes are found, MPS will pull the data from the file server, send it to the client, reset its lease, and update the cache. With regular activity, file leases should rarely expire since they are updated on most NFS operations. Expiration only occurs on idle files. MPS timeout can be configured from, for example, a minimum (e.g., 3 seconds) to a maximum (e.g., 24 hours).

Figure 7:
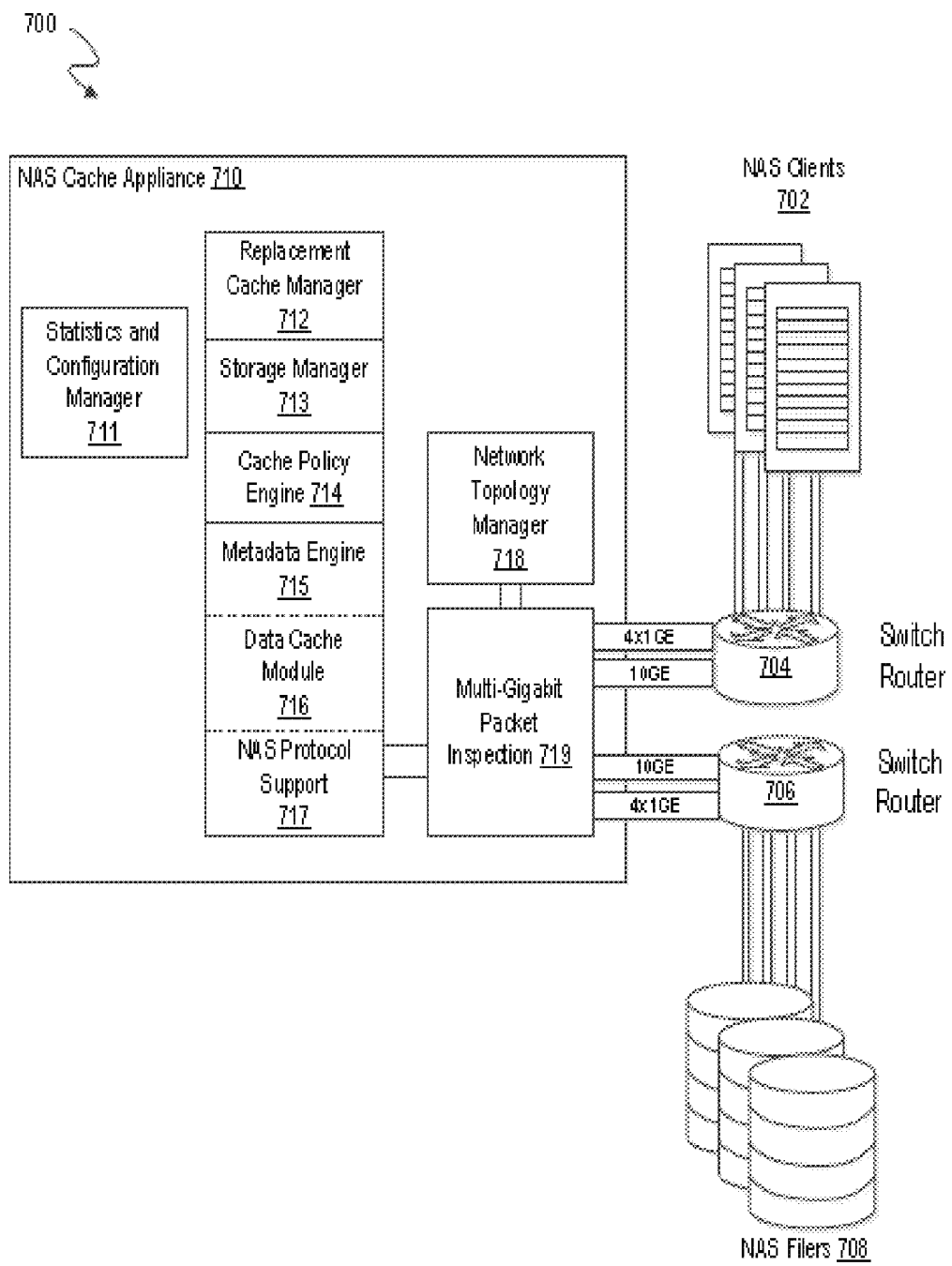
FIG. 7 illustrates a NAS cache application or system deployed on a networked system, according to one or more embodiments.

FIG. 7 illustrates an example NAS architecture network 700 in which a plurality of filers 708 are connected across switch routers 706, 704 to a plurality of remote clients 702 using an intermediate cache node appliance. With such NAS architectures, a NAS cache application or system 710 may be deployed to provide access to the network 700 that hosts both the clients 704 and NAS File System (Filers) 708. In some embodiments, the NAS cache system 710 can be implemented as one or more interconnected appliances. The NAS cache system 710 can be deployed at an intermediate location or node in the network so as to monitor, and interact with, traffic which intends to access files on the filer 708 (or filers).

The NAS cache system 710 includes a replacement cache manager 712, a storage manager 713, a cache policy engine 714, a metadata engine 715, a data cache module 716 and a NAS protocol support module 717. The storage manager 713 can include cache blocks which store segments of the NAS filers 708. The maintenance and update to the cached data of the storage manager 713 can be determined by policies as implemented by the cache policy engine 714. As described below, the replacement cache manager 712 can implement processes for replacing cached data. The metadata engine 715 further implements processes for collecting and caching metadata and attributes of cached data from the filers 708.

In some implementations, the NAS cache system 710 can use dedicated, high-speed hardware for implementing a packet inspection component 719 to inspect the packets of incoming requests to determine if they should be passed inward for further processing by the NAS cache system 710, or forwarded to another destination, such as a NAS filer 708. For example, if the NAS client 702 requests application data that is stored on the NAS cache system 710, the packet inspection 719 processes the request based on I/O profiles to determine if the request is to be processed by the NAS cache system 710. If so, the request is passed internally to the tiered memory cache system. For example, Tier 1 storage is reserved for the most critical data (including email, high transaction databases, business critical processes and line of business applications), while Tier 0 storage refers to an in-band, network-resident, policy-driven, high-performance, scalable tier of memory subsystems that is used for the storage of business critical data under control of a policy engine that is managed independently from the one or more NAS filers 708. Within the tiered memory, a volatile or dynamic random access memory virtual tier may be used to store metadata and/or application data for the fastest random I/O access, while a non-volatile random access memory (NVRAM) or Solid State Storage (SSD) provides a space for caching pending write operations to NAS filers for the purpose of maintaining data coherency in a failure event, such as network packets not arriving to their destination. If it is determined that the request cannot be serviced by the NAS cache system 710, the client request is sent to the destination NAS 708.

As depicted, the packet inspection 719 can inspect packets to extract network topology information, which in turn is provided to a network topology manager 718. The network topology manager 718 dynamically probes the network 700 to build a topology map of the accessible network devices. In some embodiments, the topology manager 718 provides a topology map so that the NAS cache system 710 responds to client requests only when it is correct to do so. In addition, the packet inspection 719 may provide other information for moving packets through the NAS cache system 710. For example, the packet inspection 719 can provide network protocol traffic state parameters to the NAS protocol support module 717 along with cache appliance IPC packets for processing at the data cache module 716. As file system objects are stored at the data cache module 716, associated metadata describing the file system objects being stored (e.g., object size, creation-time, and modification-time) are managed and cached by the metadata engine (MDE) 715. In some variations, the MDE 715 can be implemented at the NAS cache appliance 710 as, for example, a software or programmatic process.

Based on the inspected packet information, the NAS cache system 710 checks to see if the requested data is present within the local cache memory. If so, the arrival of the packet is considered a read cache-hit, and the request is satisfied directly from the appliance's cache memory. The request can be satisfied either before or after the storage manager 713 is updated pursuant to a cache replacement policy. Otherwise, the arrival of the packet coincides with a read cache-miss and the request is forwarded to the filer 708. The data returned by the filer 708 can be cached in one or more cache blocks in the storage manager 713 so that a future read request can be satisfied from the cache appliance. In addition, the received cache block(s) may be promoted based on the cache replacement algorithm implemented by the replacement cache manager 712, which can operate under the control of (or as part of) the store manager 713. While a variety of cache population algorithms are available for page replacement and cache eviction, selected embodiments of the replacement cache manager 712 implement a ranked priority mufti-queue (RPMQ) replacement algorithm that balances access frequency with customer-defined priority values. The replacement cache manager 712 may support RPMQ caching by maintaining a first set of global queues ordered by frequency of access, and a second set of per-priority shadow queues to order the blocks within each priority so that the head of the lowest queue of the lowest priority will be chosen when choosing a block to evict.

Figure 8:
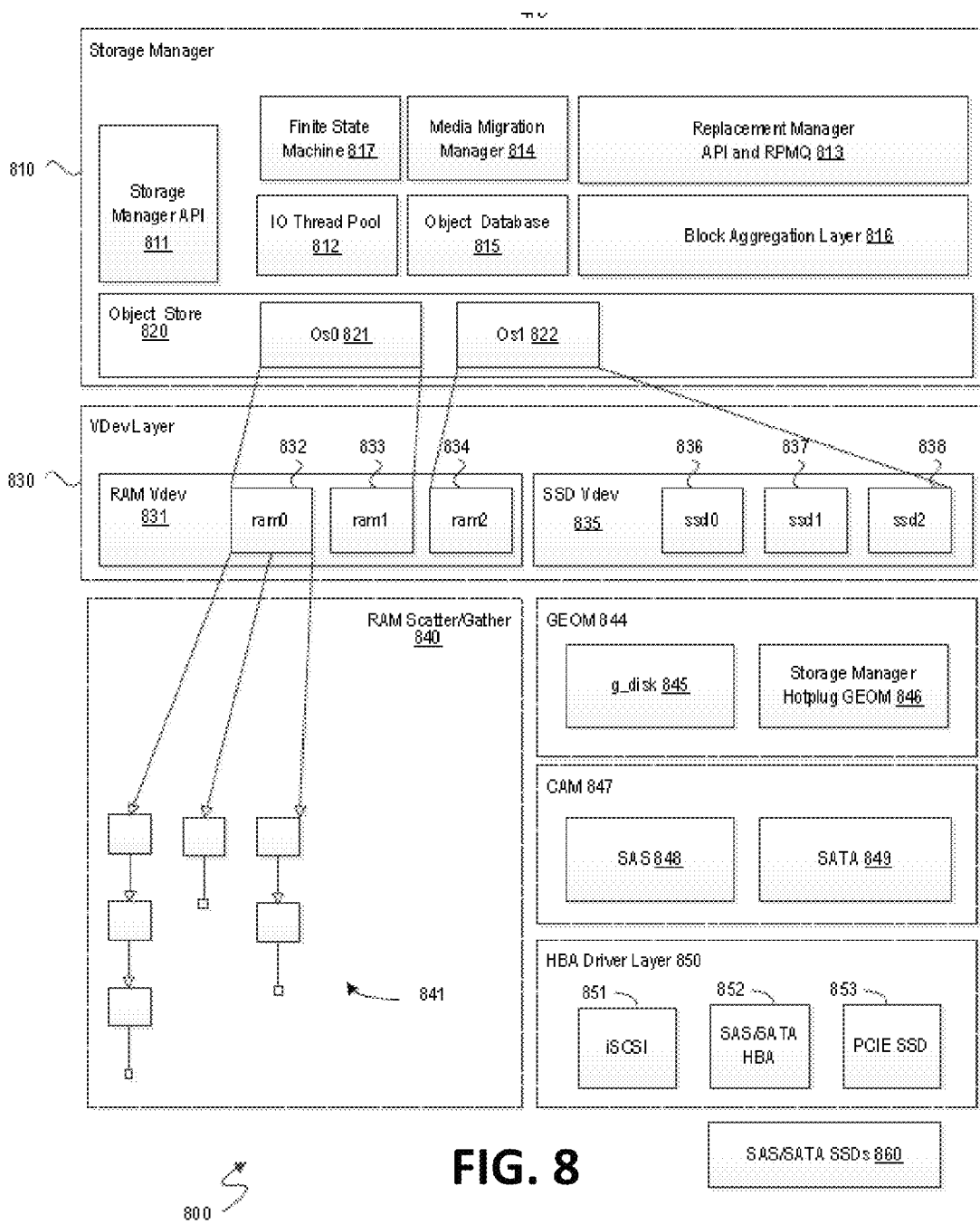
FIG. 8 illustrates a block diagram of a storage tier architecture for managing data caching at a cache node appliance such as provided by an example of FIG. 7.

FIG. 8 illustrates a block diagram of a storage tier architecture 800 for managing data caching at a cache node appliance such as provided by the NAS cache system shown in FIG. 7. As depicted, the storage tier may include a storage manager 810 that includes functionality for storing, retrieving, and invalidating object data. The storage tier may also include a virtual device layer 830 that provides an abstracted view of a logical block device. The storage tier may also include a simple file system layer and associated buffer cache (not shown), a pluggable transform layer 844 (e.g., FreeBSD's GEOM module disk transformation subsystem that provides a stackable, modular subsystem for transforming and utilizing disk I/Os in a layered and fashion) with one or more plugins 845, 846. In an example of FIG. 8, the storage tier also includes a common access method layer 847 (e.g., FreeBSD's CAM for providing an SAS interface 848 and SATA interface 849 to the SAS/SATA SSDs 860), and a host bus adapter (HBA) driver layer 850 that provides high-throughput access to persistent media devices (e.g., SSDs).

The storage manager 810 can function as the authoritative manager of the storage media. In this way, the storage manager can be responsible for providing high throughput access through a simple object persistence interface that functions within the storage tier architecture 800. Among other benefits, the storage manager 810 can provide a logical, partitioned view of the storage media to enable sharing of system resources between subsystems or protocols (NFS, CIFS) or via policy-based partitioning. The storage manager 810 can also apply caching and eviction algorithms, if required, to logical partitions. To this end, the storage manager 810 manages a multi-tier, policy-influenced block cache in the NAS cache appliance by managing a set of object stores 820 (e.g., os0 821 and os1 822). The object store 820 serves as the primary container of storage for a given tenant within the cache appliance. Each object store (e.g., 821) contains a set of virtual devices (e.g., 832, 833). Each virtual device (e.g., ram0 832) may represent a cache media device 841 within an appliance of the NAS cache system 710.

Within the storage manager 810, the object store 820 may be configured with a set of virtual devices 821, 822. This set of virtual devices may be ranked by their IO characteristics, and the total capacity across the virtual devices may be exposed as the capacity of the object store 820. In an implementation, the object store 820 contains a cache of fixed size blocks of file data. The block cache supports sparsely filled blocks and can store a subset of the data for a given file. Each block is associated with a specific media extent in a virtual device. Additionally, each file is associated with a policy and caching priority that is passed to the storage manager 810 by the metadata engine (MDE 715; see FIG. 7). More specifically, and with further
reference to an example of FIG. 7, the MDE 715 can utilize policy engine 714 at the cache appliance to resolve the customer-defined policy for a given file. In some implementations, the policy engine 714 can be implemented as a generic and reusable classification engine that uses customer-configurable dimensions to classify NAS traffic into customer-defined caching policies. The policy engine 714 can also be leveraged to create an engine that is designed to classify based on an identifying feature, such as IP or filename.

The virtual device layer 830 (VDev) of the storage tier architecture 800 represents an abstracted view of a logical block device by providing a consistent, media-independent interface for use by the storage manager 810. The storage manager 810 interacts with the media-specific virtual device layer 830 as its first-level interface to the storage media. In selected embodiments, the virtual device layer 830 can support any desired media type, including but not limited to DRAM, PCI-E attached media (e.g., PCI-e base flash adapters), SATA attached media (e.g., SSDs and hard drives), SAS accessible media (e.g., SAS SSDs and hard drives accessible via a SAS switch), iSCSI accessible media (e.g., iSCSI connected block storage devices and subsystems), Fibre Channel accessible media (e.g., Fibre Channel connected block storage devices and subsystems), and Fibre Channel over Ethernet media (e.g., Fibre Channel over Ethernet block storage devices and subsystems). Since the set of virtual devices in the object store 820 can have varied capacities, IO latencies, and throughput characteristics, the different media types may be assigned to relative tiers of performance. For example, DRAM caching media has the best performance characteristics and is considered the highest performance. The lowest tier of media might be a remote Hard Disk accessible via an iSCSI interface.

The pluggable transform layer 844 (e.g., GEOM) can be provided by the operating system (IQ OS) (e.g., FreeBSD), and provides GEOM instances (e.g., 845, 846) so that the storage tier can access SSDs.

The CAM layer 847 can be implemented as a storage framework within the FreeBSD storage stack. It provides a common abstraction to upper layers so that various heterogeneous SCSI devices can be used via the same interface.

The HBA driver layer 850 is a vendor specific driver that manages the HBA controller and enables I/O submission to the HBA.

In order to manage the mufti-tier, policy-influenced block cache memory at the NAS cache appliance 710, the storage manager 810 can operate to expose a file extent interface to the metadata engine (e.g., MDE 715 in FIG. 7), where the interface has functions that include: (1) a "write to an extent" function for writing a variable-sized buffer of data to a specific extent (or section) of a file; (2) a "read from an extent" function for reading a variable-sized section of a file to a buffer; (3) an "invalidate an object" function for invalidating a file from the cache; and (4) an "invalidate an extent" function for invalidating a variable-length extent of a file.

With further reference to FIG. 7, using the file extent interface, MDE 715 provides the cache policy engine 714 with a set of inputs gathered from the network and NAS packet headers by the packet inspection module 719 and NAS protocol support module 717. The supported classification dimensions include, but are not limited to, NAS Client IPv4 Address data, NAS Filer IPv4 Address data, NAS File system ID data, Full Directory Path Name, File Name, and file size. The cache policy engine 714 can receive customer-configured policies and converts them to policy entries in, for example, a policy lookup table. Each policy entry can be represented by a unique ID and has a customer-assigned caching priority. In selected embodiments, a plurality of different caching priorities can also be defined, such as "high," "low," "default," and "don't cache." In conjunction with the NAS cache system of FIG. 7, for example, the cache policy engine 714 can feed the packet header input from the MDE 715 through a cache policy lookup engine to produce a unique policy ID to associate with the file within the MDE 715

The storage tier architecture 800 can provide a caching algorithm that promotes and demotes blocks at will between the ranks of cache medium, while allowing priority to indicate what cache blocks can be evicted from the lowest cache rank. The caching algorithm can be implemented so that high priority blocks stay within the cache, while rarely used blocks of high priorities are precluded from wasting valuable high rank cache space. For example, a high priority cache block may be demoted to SSD from DRAM by a block of default priority but it cannot be evicted from SSD while blocks of a lower priority exist in the SSD rank To this end, a replacement block manager 813 in the storage manager 810 can be responsible for managing the cache insertion and eviction decisions for the object store 820. Each object store (e.g., 821) may run an independent instance of a replacement algorithm which may be configurable for each object store at initialization. In selected embodiments, the replacement block manager 813 implements an RPMQ caching algorithm to manage the eviction decisions. To allow for different caching algorithms to be used within the caching system, a common replacement cache abstraction may be provided in the replacement block manager 813 which enables a variety of heterogeneous replacement cache implementations to be used by the system.

As disclosed herein, the RPMQ replacement algorithm balances access frequency with customer-defined importance or priority values. Each instance of the RPMQ caching algorithm manages the replacement algorithm for a set of cache objects. Each cacheable entity is identified by a Globally Unique Identifier (GUID) and contains a replacement priority and a count of accesses. Each instance of the RPMQ caching algorithm contains two sets of LRU queues that contain cacheable entities. The first set of queues is referred to as the global queues. The second set of queues is referred to as the priority queues.

Each cacheable entity is assigned to a specific queue ID, referred to as the current queue ID, based off the current access count for the object. Each cacheable entity can be placed into both the priority queue and global queue associated with the object's current queue ID. Each cacheable entity can also include a priority designation.

In some implementations, each instance of the RPMQ caching algorithm is configured with a set of ranks. Each configured rank is associated with an equal number of queues, and each rank has a fixed capacity, which can correspond to the number of cacheable entities that can fit in the rank. The storage manager 810 can determine the number of ranks and capacity of each rank using the configured set of virtual devices (e.g., 832, 833) associated with the object store (e.g., 821).

In some implementations, each instance of the RPMQ caching algorithm also contains a cache of access history entries. Each history entry is identified by a GUID, and each history entry can contain the access count for a cacheable entity with the same GUID that has been evicted from the replacement cache.

The implementation of the RPMQ caching algorithm exposes a plurality of operations for use by the storage manager 810.

As a first example operation of the RPMQ caching algorithm, an "Object Add" operation can be executed for a cacheable entity to the replacement cache. For example, when the storage manager 810 creates a new block within its object store 830, the "Object Add" operation is executed to add the object to the cache that is subject to the RPMQ caching algorithm. The RPMQ caching algorithm looks up the Object Identifier, which can be implemented as a GUID, associated with the cacheable entity in the history cache. If a history entry exists for that GUID, the cacheable entity is initialized with the access count in the history entry. If no history entry exists, the access count is initialized to zero.

Next, the RPMQ caching algorithm can determine the appropriate rank for the cacheable entity. Each rank may contain a total capacity as well as a "greedy threshold." The greedy threshold determines the amount of space within the rank that can be filled by cacheable entities that have not earned their position in the rank due to frequency of access. The purpose of the greedy threshold is to allow higher ranks with available space to partially fill even if there are not enough cacheable entities to fill the rank based off their natural queue position. When the RPMQ caching algorithm attempts to place a new cacheable entity within a rank, it enumerates the ranks from high to low, searching for available greedy space. If greedy space exists, the cacheable entity's artificial access count is initialized to account for the number of "artificial" accesses that are required to be placed in the first queue of the chosen rank. If no greedy space exists in ranks higher than the cacheable entity's natural rank, then the artificial access count is initialized to zero. In either case, the current queue number is calculated using the sum of the real and artificial access counts. The cacheable entity is then inserted in both the global and priority queues associated with the current queue ID.

As another example operation of the RPMQ caching algorithm, an "Object Remove" operation can be executed to request removal of a cacheable entity from the Replacement Cache. This operation may be executed when the storage manager 810 determines that it needs to remove a block from its cache. For example, the operation can be performed when the MDE 715 determines that the block is no longer valid because the file was truncated, or when the MDE 715 has determined that the file data is no longer in sync with the file as it exists on the File Server.

For example, when the storage manager 810 determines that a block must be removed from the cache, the "Object Remove" operation is executed against the cacheable entity to be removed. The RPMQ caching algorithm removes the cacheable entity from its global and priority queues and executes the removed callback to indicate to the storage manager 810 that the cacheable entity is safely removed from the cache in use with the RPMQ caching algorithm. The storage manager 810 can be notified that the object has been released when it receives a removed or evicted callback from implementation of the RPMQ caching algorithm.

Another example of an operations of the RPMQ caching algorithm includes "Object Read Access" operations. Such operations can be executed to indicate to the implementation of the RPMQ caching algorithm that a cacheable entity has been accessed by a read operation. Still further, another example of an RPMQ operation of the RPMQ caching algorithm includes an "Object Write Access" operation, which indicates for implementation of the RPMQ caching algorithm that a cacheable entity has been accessed by a write operation. For example, when the storage manager 810 receives a read or write IO from the MDE 715, a "Read Access" or "Write Access" operation is invoked on each of the cacheable entities (the blocks) that are the subject of the IOs. The access operations update the access count for the cacheable entity and then determine if the new access count promotes the object to a different queue. If a promotion is earned, the cacheable entity is queued at the tail of the global and priority queues associated with the new queue. If there is no promotion, the cacheable object is queued at the tail of the priority and global queues for its current queue identifier. If queue promotion causes the cacheable entity to transition to a new rank, the storage manager 810 may execute a rank transition callback (described below) on behalf of the cacheable entity.

Yet another example of an operation of the RPMQ caching algorithm is an "Object Priority Change" operation, which can be executed to change the current replacement priority for a cacheable entity. For example, the "Object Priority Change" operation may be used when the MDE 715 passes the Policy ID with each read or write operation passed to the storage manager 810. The storage manager 810 can assign the policy ID to the file affected by the IO. If the policy assigned to the file has changed, performance of this IO operation causes the storage manager 810 to launch a background operation to adjust the policy ID of each cached block of the affected File. Blocks that are affected by the present IO can update their associated policy inline. Whenever the policy is changed on a cacheable entity within a cache in use with implementation of the RPMQ caching algorithm, the entity is removed from the priority queue associated with its current queue identifier and current priority and enqueued into the correct queue for its new priority and current queue identifier.

As another example of an operation of the RPMQ caching algorithm, a "Rank Evict" operation can be implemented to request the eviction algorithm to run against a specific rank of the cache in use with the RPMQ caching algorithm. In addition to the operations listed above, the storage manager 810 provides the RPMQ replacement cache with a set of callback operations.

A rank transition callback is performed whenever the RPMQ caching algorithm determines that a cacheable entity has been promoted or demoted across a "rank boundary". A rank transition callback can be invoked to indicate, to the storage manager 810, the cacheable entity affected by the rank transition. The rank transitions can also indicates the new rank. The storage manager 810 responds to the rank transition callback by migrating the data associated with cached block from its current media extent in its currently assigned tier to a media extent in a new tier.

A rank pressure callback can be invoked to indicate to the storage manager 810 that a specific rank is under pressure.

A removed callback can be invoked to indicate to the storage manager 810 that a cacheable entity has been successfully removed from the replacement cache.

Still further, each cache of the RPMQ caching algorithm can be associated with a configured queue lifetime and a global time. Both lifetime and global time are measured in total number of read or write accesses affecting the cache. Queue lifetime indicates how "long" an object can exist in a queue before it should be demoted. Whenever a cacheable entity is re-queued, its time in queue is set to the current global time. Once a cacheable entity's time in its current queue has exceeded the queue lifetime, the cacheable entity is demoted to the next lower queue. This mechanism enables at-rest blocks to cascade down to less important media ranks and eventually out of the cache entirely.

The evicted callback can be invoked to indicate to the storage manager 810 that a cacheable entity has been evicted. Each rank of an instance of the RPMQ caching algorithm contains a configured capacity as well as an eviction threshold. When a cacheable entity is inserted into the rank and that insert takes the total number of cacheable entities in that rank above the eviction threshold, the rank is said to be "under pressure". When a rank becomes under pressure, rank eviction occurs in order to bring the total number of entities in that rank, also known as the inuse count, back below the eviction threshold.

A rank eviction mechanism can be specific to the position of the rank in the cache. All ranks above the base rank can evict strictly by access frequency. When a non-base rank is under pressure, the eviction algorithm evicts the first entity in the lowest queue of the rank and demotes that entity to the highest queue of the next lower rank. The eviction mechanism continues with this process until the inuse count for the rank is below the eviction threshold. Demoting cacheable entities to a lower rank will invoke a rank transition callback to the storage manager 810. The storage manager 810 can respond by moving the cache block to a new media tier as described under "Rank Transition" above.

A lowest rank, or base rank, can be implemented to have special behavior. When the base rank is under pressure, the cache is considered to be under pressure. Eviction from cache is performed in strict priority order. The cache eviction mechanism starts with the lowest priority and works through all queues in that priority until enough cacheable entities have been evicted to relieve the cache pressure. If all queues in the lowest priority have been cleared and the cache is still under pressure, the eviction mechanism can move to the next higher priority. Evicting cacheable entities from the cache invokes the evicted callback to the storage manager 810. The storage manager 810 responds by removing the cache block from the object store and freeing any caching media associated with the evicted cache block.

Figure 9:
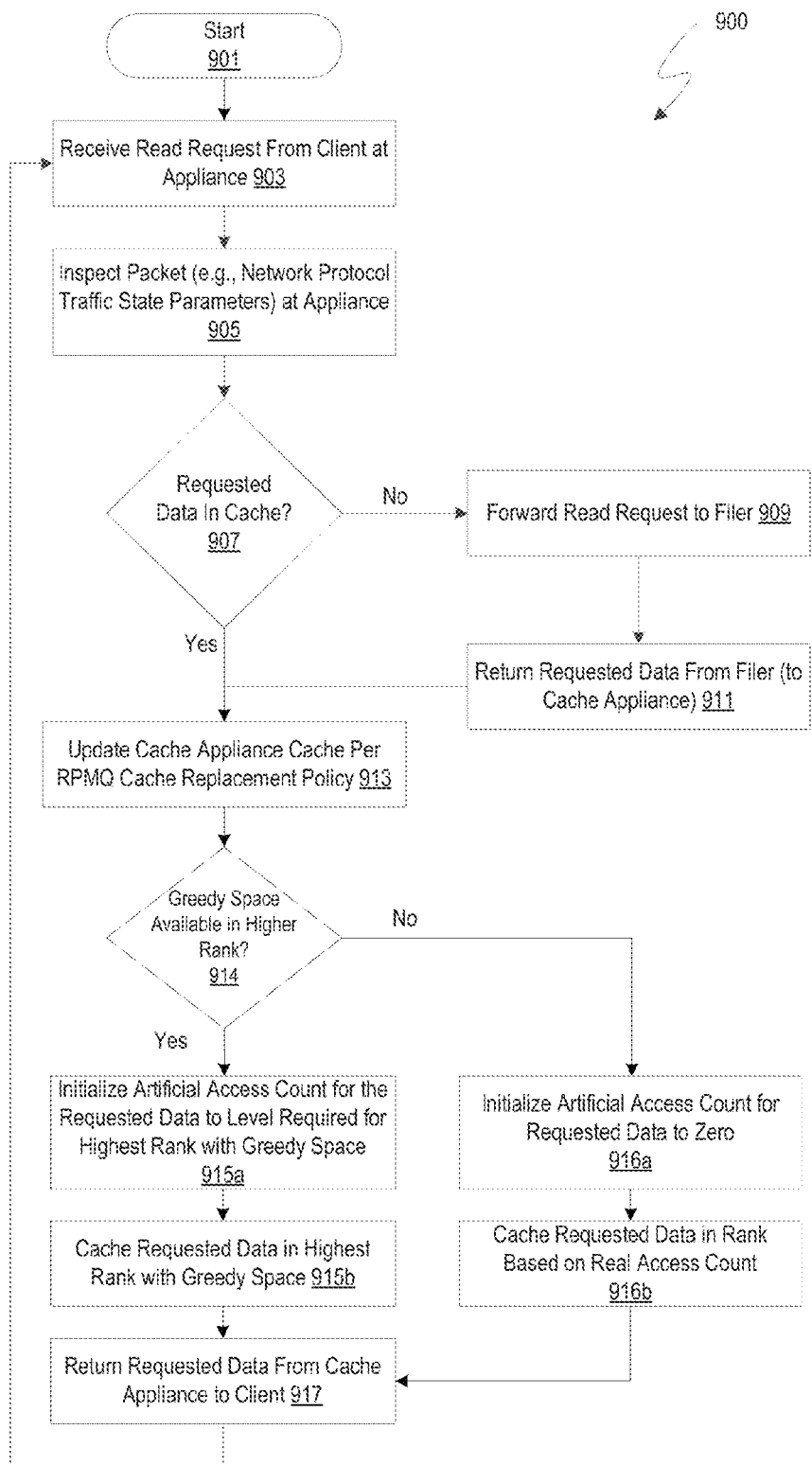
FIG. 9 illustrates an example process flow for caching storage data at a cache appliance using spliced connections.

FIG. 9 illustrates an example process flow 900 for caching storage data at a cache appliance using spliced connections. The process starts (step 901), such as when a cache appliance is positioned between the storage clients and the NAS filers. In operation, the cache appliance operates to intercept requests between the clients and filers, while providing read and write cache acceleration by storing and recalling frequently used information. After receiving a read request from a client (step 903), the cache appliance inspects the packet information associated with the request (step 905) to obtain information for moving the packet through the system (e.g., network protocol traffic state parameters). The inspected information is used to identify packets that need to be processed by the cache appliance, as well as packets that are to be forwarded by the cache appliance. Based on the inspected information, the cache appliance checks to see if the requested data is present within the appliance's cache memory. If so (affirmative outcome to decision 907), a read cache-hit determination is made, and the request is satisfied directly from the appliance's cache memory (step 915) before or after updating the cache memory pursuant to the ranked priority multi-queue replacement (RPMQ) policy (step 913). Otherwise, a read cache-miss (negative outcome to decision 907) determination is made, and the cache appliance forwards the read request to the filer (step 909). The data returned by the filer (step 911) may be cached in one or more cache blocks in the appliance's cache memory so that the read request can be satisfied from the cache appliance (step 913). The cache block can be promoted using the RPMQ cache replacement algorithm that balances access frequency with customer-defined priority values. The RPMQ policy can determine whether greedy space exists in ranks higher than the requested data's natural rank (step 914). If such greedy space exists, the cacheable entity's artificial access count is initialized to account for the number of "artificial" accesses that are required to be placed in the first queue of the chosen rank (step 915*a*). In some examples, the chosen rank is the highest rank with greedy space available (step 915*b*). If no greedy space exists in ranks higher than the cacheable entity's natural rank, then the artificial access count is initialized to zero (step 916*a*). In this case, the cacheable entity is placed in its natural rank based on the real access count (step 916*b*). Regardless of the RPMQ policy applied, the cache appliance returns the requested data to the client (step 917). The RPMQ cache replacement algorithm may be implemented by maintaining a first set of global queues ordered by frequency of access, and a second set of per-priority shadow queues to order the blocks within each priority so that the head of the lowest queue of the lowest priority will be chosen when choosing a block to evict.

Figure 10:
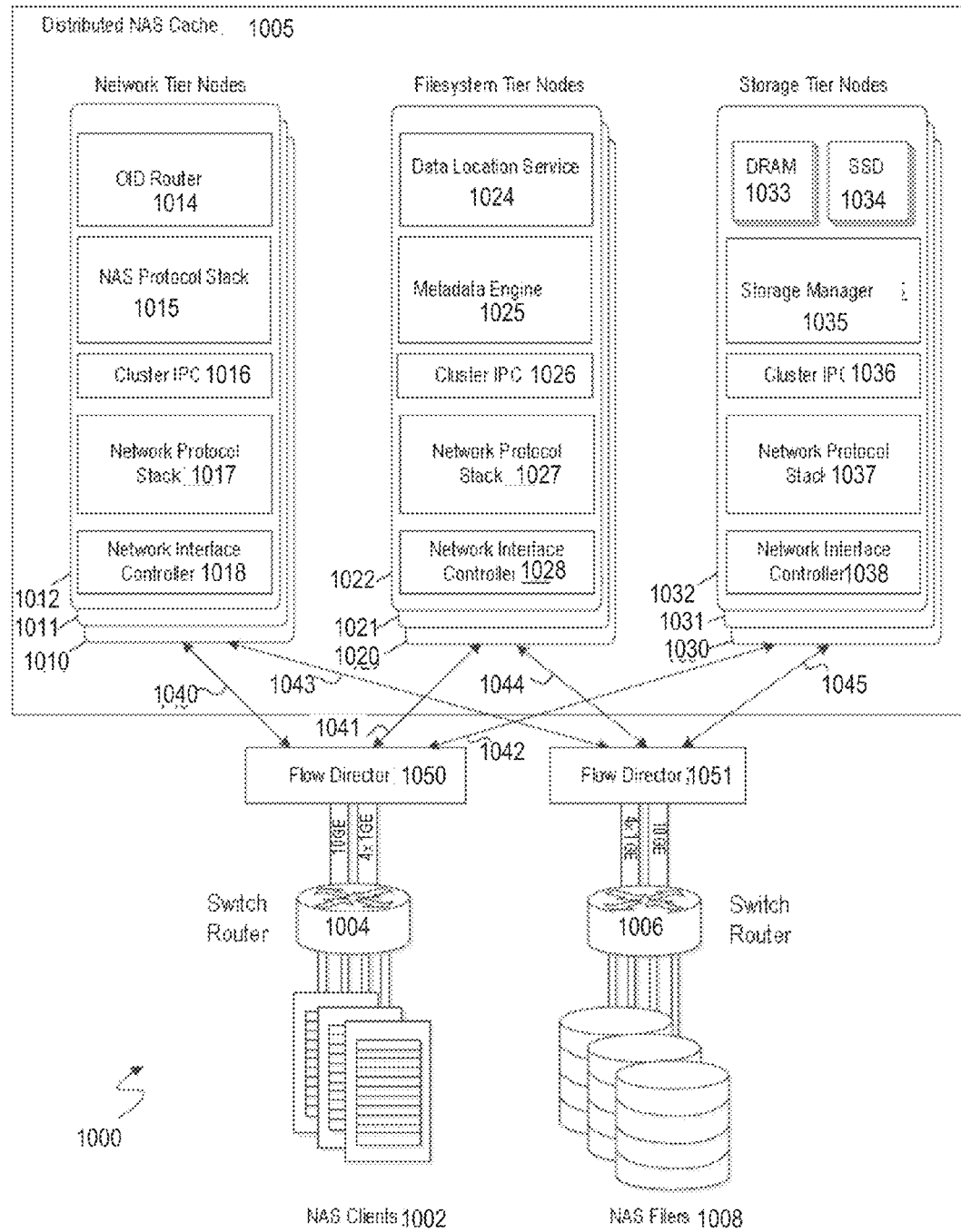
FIG. 10 illustrates a NAS architecture network according to another embodiment.

FIG. 10 illustrates a NAS architecture network 1000 according to another embodiment. In an example of FIG. 10, a plurality of filers 1008 are connected across switch routers 1006, 1004 to a plurality of remote clients 1002. The NAS architecture network 1000 includes an intermediate distributed NAS cache 1005. The NAS cache 1005 is connected to redundant flow director appliances 1050, 1051 over interconnect system bus 1040-1045. Examples recognize that within such NAS architectures, NAS workloads associated with different filers 1008 can have varied performance and scaling requirements, depending upon the application workload. For example, one NAS workload may have high I/O Operations Per Second (IOPS) performance requirements, requiring the NAS cache 1005 to scale packet processing rates. A different NAS workload may be bandwidth intensive, requiring the NAS cache 1005 to scale 10 throughput. A third NAS workload may contain a large dataset size, requiring the NAS cache 1005 to scale the cache capacity. Additionally, some workloads may benefit from scaling in more than one dimension in either direction. To address these challenges with a solution that enables multi-dimensional scaling of cache resources to optimally fit a customer's workload, the distributed NAS cache 1005 is provided with a mufti-tier architecture formed with networked plurality of nodes 1010-1012, 1020-1022, 1030-1032. The networked nodes 1010-1012, 1020-1022, 1030-1032 operate in concert to create a unified NAS cache. As described more fully below, the distributed NAS cache 1005 can be scaled up or down in any dimension to increase or decrease bandwidth, compute, or caching media resources to balance the requirements of the customer's NAS workload and cost of the solution.

As illustrated, the distributed NAS cache 1005 is formed as a networked system of multiple nodes that are organized in separate tiers working in concert to create a unified NAS cache. Each node can correspond to a logical processing entity within the cache cluster that is dedicated to a physical appliance, or which is co-located with other nodes. In some implementations, nodes can also be virtualized and share a physical appliance. In an embodiment, first set of nodes 1010-1012 form a network tier having software components (e.g., 1014-1018) responsible for processing of ingress and egress network and NAS protocol traffic. A second set of nodes 1020-1022 can form a file system tier having software components (e.g., 1024-1028) responsible for caching and life-cycle management of a sparse file system namespace. A third set of nodes 1030-1032 cam form a storage tier having software components (e.g., 1033-1038) responsible for management of a sparse data cache. In selected embodiments, the different tiers (e.g., network, file system, and storage) can be contained within a single physical appliance or spread across multiple physical appliances.

In the distributed NAS cache 1005, the different processing tiers can have their constituent nodes connected together via a high-performance cluster fabric 1040-1045, which may be formed with one or more Ethernet switches. Among other benefits, the switch fabric enables low-latency, high throughput network access to any other appliance within the distributed NAS cache 1005.

Additionally, tiers within the distributed NAS cache 1005 may communicate via a Cluster Messaging Protocol referred to as Cluster IPC 1016, 1026, 1036. Each cluster IPC 1016, 1026, 1036 provides a reliable, high throughput facility for passing messages between different tiers of the distributed NAS cache 1005 by providing a common abstraction regardless of message destination. In other words, communication with local and remote nodes uses the same API. Each cluster IPC 1016, 1026, 1036 may also preserve message boundaries in order to avoid the requirement that the receiving application re-establish the message boundaries.

The network tier (e.g., 1012) of the distributed NAS cache 1005 can be responsible for all network packet reception and transmission of customer NAS network traffic. In addition to the flow director logical entities 1050, 1051, the network tier includes a set of network computation nodes 1010-1012. Each flow director 1050, 1051 is responsible for integrating with the network infrastructure of the customer's NAS deployment by identifying NAS traffic that should be forwarded to the distributed NAS cache 1005. Any other non-NAS traffic is forward unperturbed between the customer's endpoints. The flow directors' affine network flows to specific network tier nodes in order to ensure that all packets of each flow are processed by the same node.

Each network computation node 1010-1012 of the network tier may include a plurality of network node components, including a Network Interface Controller (NIC) 1018, network protocol stack 1017, cluster IPC 1016, NAS protocol stack 1015, and OID router 1014.

In some implementations, the NIC 1018 may be implemented as a hardware component that is responsible for implementing the electronic circuitry required to communicate using a specific physical layer and data link layer standard. For example, the NIC 1018 may implement an Ethernet physical layer signaling protocol, control the reception and transmission of Ethernet frames, generate and validate Ethernet frame check sequence (FCS), and offload network protocols, such as IP, TCP and UDP checksum generation and validation, TCP segmentation and segment aggregation.

The network protocol stack 1017 may be implemented as a software component that is responsible for processing of reception and transmission of Layer 2 (Ethernet), Layer 3 (IP) and Layer 4 (UDP, TCP, SCTP) of the OSI protocol stack.

The NAS protocol stack 1015 may be implemented as a software component that is responsible for processing and generation of NAS protocol network traffic. The NAS protocol layer frames individual NAS transactions and reduces the NAS-specific file system object identifier (e.g. the NFS file handle) to a protocol-agnostic object identifier (OID).

The centralized OID router 1014 may be implemented as a software component that is referenced to acquire a valid cluster "route", or mapping of the OID to an assigned node within the file system tier (e.g., 1022). In some implementations, each OID is assigned to one and only one file system tier node in the cluster at any one time. The intelligent OID router uses a variety of information to determine the dynamic route distribution, including cluster load feedback, OID access locality, and cluster node capability. This file system tier node in the cluster is referred to as the authoritative "owner" of the file that is the subject of the NAS transaction. The NAS protocol layer 1015 forwards the NAS transaction to the authoritative file system tier node over a Cluster IPC connection 1016.

With the disclosed network node components, each network tier may be scaled in one or more dimensions. In selected embodiments, the flow director port type may be scaled to provide increased network bandwidth. In addition or in the alternative, the network interfaces may be scaled to provide increased network bandwidth. Finally, the network tier nodes may be scaled to provide increased computational processing dedicated to the network tier for use in increasing throughput as well as packet processing rates.

The file system tier (e.g., 1022) of the distributed NAS cache 1005 is responsible for managing the state of the dataset that is being cached. Each file system computation node 1020-722 of the file system tier may include a plurality of file system node components, including a Network Interface Controller (NIC) 1028, network protocol stack 1027, cluster IPC 1026, metadata engine 1025 that manages and caches the metadata associated with cache files, and data location service 1024.

In operation, the file system tier (e.g., 1022) receives NAS transactions from the network tier (e.g., 1012) and processes them through a Finite State Machine. The file system tier satisfies NAS metadata transactions directly from its cache of file system object metadata. The file system tier satisfies NAS data transactions by interfacing with the partner node in the storage tier (e.g., 1032) that is the authoritative owner of the cache data associated with the NAS transaction.

If the NAS transaction can be satisfied directly from the file system tier metadata cache, or the storage tier data cache, the response is immediately sent back to the network tier in order for the NAS protocol layer 1015 to respond back to the NAS client.

If the request cannot be satisfied by the distributed NAS cache 1005, the NAS transaction is forwarded back to the originating ingress node of the network tier (e.g., 1012) over Cluster IPC 1026. The network tier 1012 then forwards the original NAS protocol request to the filer 1008. The filer's response is received and processed by the network stack 1017 and NAS protocol layer 1015 of the network tier 1012. This filer's response causes the original NAS transaction to be sent back to the file system tier over Cluster IPC 1016. Once the file system tier has processed the NAS response through its Finite State Machine, the transaction is sent back to the NAS Protocol Layer 1015 in the Network Tier 1012 over Cluster IPC 1026 for final completion. The NAS Protocol Layer 1015 completes the transaction once and for all by responding to the NAS client 1002 that originated the request.

With the disclosed file system computation nodes, each file system tier may be scaled in one or more dimensions. In selected embodiments, the file system computation nodes may be scaled to provide increased computational processing dedicated to the file system tier for use in increasing IO throughput and transactional throughput. In addition or in the alternative, the cache media resources used by the file system tier may be scaled to increase the amount of media available for storing of file system metadata. Thus, the file system tier can be scaled by increasing the number of file system tier nodes, by increasing the amount of media per node, or both. The file system tier caching media may be implemented with a variety of different media types, including but not limited to DRAM and SSDs.

The storage tier (e.g., 1032) of the distributed NAS cache 1005 may be responsible for managing a sparse cache of file data associated with file system objects that are managed by the file system tier. Each computation node 1030-1032 of the storage tier may include a plurality of storage node components, including a Network Interface Controller (NIC) 1038, network protocol stack 10310, cluster IPC 1036, storage manager 1035, DRAM 1033, and SSD 1034. The storage tier (e.g., 1032) is coupled with the file system tier (e.g., 1022) to maintain cache consistency with the customer's file systems. Thus, the storage tier 1032 contains one or more instances of data caches built from multiple heterogeneous tiers of caching media. For example, Tier 1 storage can be reserved for the most critical data (including email, high transaction databases, business critical processes and line of business applications), while Tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a volatile or dynamic random access memory virtual tier may be used to store metadata and/or application data for the fastest random I/O access, while a non-volatile random access memory (NVRAM) or Solid State Storage (SSD) provides a space for caching pending write operations to NAS filers for the purpose of maintaining data coherency in a failure event, such as network packets not arriving to their destination.

In operation, when the file system tier 1022 receives a read I/O request from the NAS client, the file system tier 1022 references a data location service 1024 to identify which node of the Storage Tier 1032 should contain the file data. The File system Tier node 1022 then sends the read I/O to the storage tier node 1032 over Cluster IPC 1026. The storage tier node 1032 receives this read I/O and attempts to satisfy the read request by looking up the requested extent of data in its block cache. The storage tier node 1032 then responds to the file system tier 1022 with a reply vector that indicates what portion of the request was satisfied along with the associated data.

With the disclosed storage tier computation nodes, each storage tier may be scaled in one or more dimensions. In selected embodiments, the storage tier computation nodes may be scaled to provide increased compute processing dedicated to the storage tier for use in increasing IO throughput as well as transactional throughput. As an addition or alternative, the cache media resources used by the storage tier may be scaled to increase the amount of media available for storing of file system data. Thus, the storage tier can be scaled by increasing the number of storage tier nodes, by increasing the amount of media per node, or both. The storage tier caching media can consist of a variety of different media types, including but not limited to DRAM and SSDs.

As described herein, the NAS cache appliance is the fundamental element of the data storage cache system, and is implemented as a combination of a high-speed packet processor and a large cache memory. While a variety of different architectures may be used to implement the cache appliance, an example hardware implementation which may be used includes a network switch interconnect component for routing network traffic, a processor component for packet processing, a cache controller, and cache memory component for storing cached data files. The high-speed network switch provides client and filer interfaces and multiple 10 Gbps connections to the packet processing and cache controller hardware, manages data flow between the client/filer I/O ports and the packet processing and cache controller hardware, and may be optimized for network traffic where it is desirable to obtain extremely low latency. In addition, one or more processor units are included to run the core software on the device to perform node management, packet processing, cache management, and client/filer communications. Finally, a substantial cache memory is provided for storing data files, along with a cache controller that is responsible for connecting cache memory to the high-speed network switch.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium that stores instructions for caching a networked file system, the instructions being executable by one or more processors to cause the one or more processors to perform operations comprising:
    connecting a cache system in-line as between a networked file system and one or more clients of the networked file system, the cache system including one or more appliances that store data corresponding to at least a portion of the networked file system;
    assigning each of multiple cache resources to one of a plurality of ranks, wherein the cache resources of each rank include a greedy capacity;
    processing requests from the one or more clients to access file system objects stored on the networked file system;
    wherein processing the requests includes determining whether individual requests specify data from the networked file system that are also stored in the cache system;
    wherein for each processed request that specifies data stored in the cache system, providing a response to the individual requests using data that is stored in the cache system; and
    wherein for each processed request that specifies data that is not stored with the cache system:
    forwarding the request to the networked file system;
    receiving a response from the networked file system, the response including data corresponding to a file system object stored on the networked file system;
    storing cache data corresponding to the file system object;
    determining a natural rank for the cache data based at least in part on an access count of the file system object;
    determining a highest rank of the cache resources with available greedy capacity;
    upon determining that the highest rank of the cache resources with available greedy capacity is higher than the natural rank, (i) increasing, to a level consistent with the highest rank determined, an artificial access count of the file system object, and (ii) assigning the cache data to the cache resources of the highest rank determined;
    assigning the cache data to the cache resources of the natural rank when there are no cache resources with available greedy capacity higher than the natural rank; and
    forwarding the response from the networked file system to a client from which the individual requests originated.

2. The non-transitory computer-readable medium of claim 1, wherein the instructions for storing cache data further include instructions for:
    determining a priority designation for the file system object corresponding to the data corresponding to the file system object stored on the network file system returned with the response; and
    storing the cache data in the cache resource based on the priority designation of the file system object.

3. The non-transitory computer-readable medium of claim 2, wherein the priority designation for the file system object data is based on one or more user-defined policies.

4. The non-transitory computer-readable medium of claim 3, further comprising instructions for determining when to evict the cache data from the cache resource based on the priority designation.

5. The non-transitory computer-readable medium of claim 4, further comprising instructions for evicting the cache data from the assigned cache resources by performing one of (i) removing the cache data from the cache resources of the assigned rank and storing the cache data with cache resources of a lower rank if the assigned cache resources do not belong to the lowest rank, else (ii) removing the cache data from the cache resources of the assigned rank so that the cache data is no longer cached.

6. The non-transitory computer-readable medium of claim 1, wherein each of the multiple cache resources is assigned to one of the plurality of ranks based on a type of memory employed with that cache resource.

7. A cache system comprising:
    multiple cache resources;
    one or more processors to:
    connect the cache system to a networked file system, the cache system being connected in-line as between the networked file system and one or more clients of the networked file system;
    assign each of multiple cache resources to one of a plurality of ranks, wherein the cache resources of each rank include a greedy capacity;
    process requests from the one or more clients to access file system objects stored on the networked file system by:
    (i) determining whether individual requests specify data from the networked file system that are stored in the cache system, and for each processed request that specifies data stored in the cache system, provide a response to the individual requests using data that is stored in the cache system; and (ii) for each processed request that specifies data that is not stored locally in the cache system:

forward the request to the networked file system;

receive a response from the networked file system, the response including data corresponding to a file system object stored on the networked file system;

store cache data corresponding to the file system object;

determine a natural rank for the cache data based at least in part on an access count of the file system object;

determine a highest rank of the cache resources with available greedy capacity;

upon determining that the highest rank of the cache resources with available greedy capacity is higher than the natural rank, (i) increase, to a level consistent with the highest rank determined, an artificial access count of the file system object, and (ii) assign the cache data to the cache resources of the highest rank determined;

assign the cache data to the cache resources of the natural rank when there are no cache resources with available greedy capacity higher than the natural rank;

forward the response from the networked file system to a client from which the individual requests originated.

8. The cache system of claim 7, wherein the one or more processors are to further assign each of the multiple cache resources to one of the plurality of ranks based at least in part on a type of memory used with that cache resource.

9. The cache system of claim 7, wherein the one or more processors are to further provide a policy engine that receives input for determining multiple policies, and to determine a priority designation for the cache data based on one or more of the multiple policies.

10. The cache system of claim 7, wherein the one or more processors are to further:

determine a priority designation for the file system object corresponding to the data corresponding to the file system object stored on the network file system returned with the response; and store the cache data in the cache resource based on the priority designation of the file system object.

11. The cache system of claim 10, wherein the one or more processors are to determine when to evict the cache data from the cache resource based on the priority designation.

* * * * *